United States Patent
Ogata et al.

(10) Patent No.: US 10,087,029 B2
(45) Date of Patent: Oct. 2, 2018

(54) SHEET CONVEYANCE DEVICE, IMAGE FORMING APPARATUS, AND IMAGE READING APPARATUS

(71) Applicant: CANON KABUSHIKI KAISHA, Tokyo (JP)

(72) Inventors: Atsushi Ogata, Mishima (JP); Motohiro Furusawa, Shizuoka (JP); Akira Kuroda, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/703,816

(22) Filed: Sep. 13, 2017

(65) Prior Publication Data
US 2018/0093842 A1   Apr. 5, 2018

(30) Foreign Application Priority Data

Sep. 30, 2016   (JP) .................................. 2016-192722

(51) Int. Cl.
*B65H 29/12*   (2006.01)
*B65H 85/00*   (2006.01)
*B65H 15/00*   (2006.01)

(52) U.S. Cl.
CPC ........... *B65H 29/125* (2013.01); *B65H 15/00* (2013.01); *B65H 85/00* (2013.01); *B65H 2404/166* (2013.01)

(58) Field of Classification Search
CPC ...... B65H 29/125; B65H 85/00; B65H 15/00; B65H 5/062; B65H 2404/166
USPC .................................. 271/186, 304, 225, 272
See application file for complete search history.

(56) References Cited

U.S. PATENT DOCUMENTS

| | | | | |
|---|---|---|---|---|
| 5,720,478 A * | 2/1998 | Carter | ................... | B65H 15/00 271/186 |
| 5,887,868 A * | 3/1999 | Lambert | ................ | B65H 5/062 271/186 |
| 7,918,451 B2* | 4/2011 | Honda | ................... | B65H 29/12 271/186 |
| 2002/0158404 A1* | 10/2002 | Carter | ................... | B65H 15/00 271/186 |

(Continued)

FOREIGN PATENT DOCUMENTS

| JP | 2008285279 A | 11/2008 |
|---|---|---|
| JP | 2014205572 A | 10/2014 |
| JP | 2015083353 A | 4/2015 |

*Primary Examiner* — David H Bollinger
(74) *Attorney, Agent, or Firm* — Canon U.S.A., Inc. IP Division

(57) ABSTRACT

A sheet conveyance device includes first, second, and third rotating members and a switching unit. The first rotating member rotates in one direction. The second rotating member conveys a sheet in a first direction with the first rotating member rotating. The third rotating member conveys the sheet in a second direction, different from the first direction, in conjunction with the first rotating member rotating. The switching unit switches from a first state where the second rotating member contacts a sheet first surface and the first rotating member contacts a sheet second surface to a second state in which the first rotating member contacts the first surface of the sheet and the third rotating member contacts the sheet second surface by moving the second rotating member before a trailing edge of the sheet conveyed in the first direction is conveyed by the first rotating member and the second rotating member.

19 Claims, 24 Drawing Sheets

(56) References Cited

U.S. PATENT DOCUMENTS

2003/0071409 A1* 4/2003 Sumi .................. B65H 5/36
271/186
2008/0179822 A1* 7/2008 Tu ................ H04N 1/00572
271/186

* cited by examiner

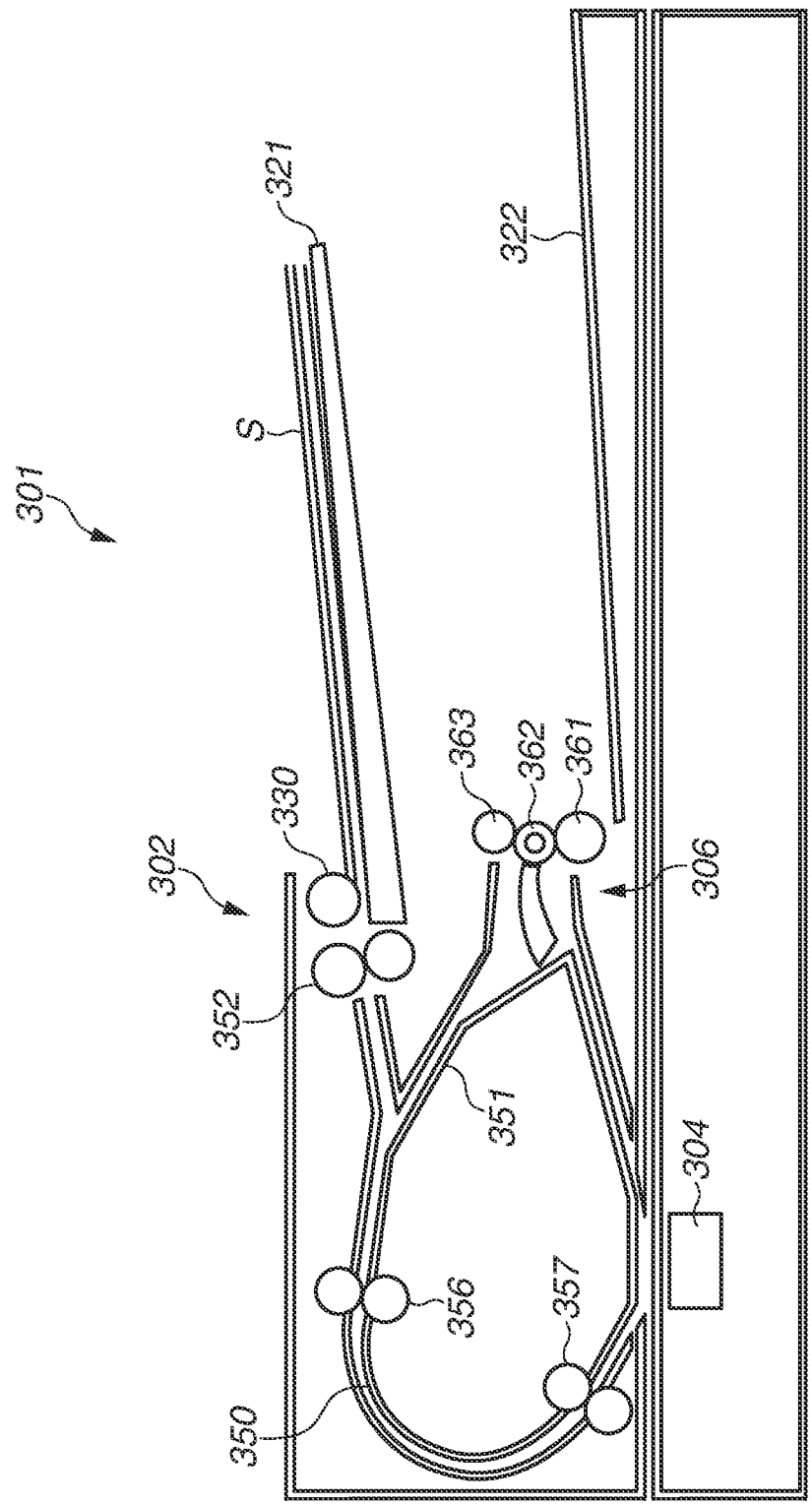

SHEET CONVEYANCE DEVICE, IMAGE FORMING APPARATUS, AND IMAGE READING APPARATUS

BACKGROUND OF THE INVENTION

Field of the Invention

Aspects of the present disclosure generally relate to a sheet conveyance device which sequentially conveys sheets, an image forming apparatus, such as a copying machine, a printer, and a facsimile apparatus, which is equipped with the sheet conveyance device, and an image reading apparatus.

Description of the Related Art

In recent years, image forming apparatuses have been expected to cope with further resource saving, so that the use of two-sided printing (duplex printing) has become widespread with respect to sheets, such as paper, overhead projector (OHP) sheets, plastic sheets, and cloth. Therefore, in image forming apparatuses having a two-sided printing function, importance is put on increasing the number of output sheets of two-sided printing per unit time, in other words, improving two-sided printing productivity.

Japanese Patent Application Laid-Open No. 2015-083353, which serves as related art, discusses a configuration in which a reversing portion which reverses sheets is provided with a reversing roller group including one driving roller which receives driving force to rotate only in one direction, a first driven roller, and a second driven roller. In this configuration of the reversing roller group, the three rollers are aligned approximately in a straight line in the order of the first driven roller, the driving roller, and the second driven roller regarding a direction intersecting with the sheet conveyance direction. The first driven roller is located opposite the driving roller to form a first nip portion, and the second driven roller is located opposite the driving roller in a direction different from that of the first driven roller to form a second nip portion.

In the reversing portion discussed in Japanese Patent Application Laid-Open No. 2015-083353, reversal of a sheet is performed as follows. First, a sheet having an image formed on a first surface thereof is conveyed toward the first nip portion of the reversing roller group. After that, the sheet is conveyed at the first nip portion in a first direction, which is a direction to discharge the sheet from the reversing roller group, and the trailing edge of the sheet regarding the sheet conveyance direction passes through the first nip portion. The reversing portion is provided with a switchback portion, which temporarily contains a sheet, at the downstream side of the first nip portion regarding the sheet conveyance direction, and the sheet having passed through the first nip portion is contained in the switchback portion. After that, the sheet having been temporarily contained in the switchback portion falls by its own weight, so that the trailing edge of the sheet is guided to the second nip portion of the reversing roller group. Since the driving roller is rotating only in one direction, the sheet nipped by the second nip portion is conveyed in a second direction, which is a direction opposite to the first direction, which is the conveyance direction in the first nip portion. After that, the sheet is re-conveyed to an image forming portion, and, after an image is formed on a second surface of the sheet, the sheet is conveyed to a sheet discharge portion, which is provided at a position different from that of the reversing portion. Then, the sheet is discharged from inside the image forming apparatus by a sheet discharge roller of the sheet discharge portion.

More specifically, in the configuration discussed in Japanese Patent Application Laid-Open No. 2015-083353, the sheet is completely discharged from the reversing roller group to the switchback portion and is temporarily contained in the switchback portion, and a nip portion by which the sheet is nipped is switched from the first nip portion to the second nip portion. With this configuration, when two-sided printing is continuously performed on a plurality of sheets, during a period in which the first sheet passes through the first nip portion and is contained in the switchback portion, the second sheet, which is a subsequent sheet, can be conveyed to the first nip portion.

However, in the configuration discussed in Japanese Patent Application Laid-Open No. 2015-083353, in which reversal of a sheet is performed with the sheet completely discharged from the first nip portion of the reversing roller group, the downstream side of the reversing roller group regarding the sheet conveyance direction is required to be provided with a switchback portion which temporarily contains a sheet. In a case where the switchback portion is provided, since a sheet discharged from the reversing roller group is inevitably contained in the switchback portion, a sheet discharge portion, which discharges a sheet from inside the image forming apparatus, is required to be provided at a position different from that of the reversing portion, which reverses a sheet. This causes an issue that the apparatus may be increased in size.

SUMMARY OF THE INVENTION

Aspects of the present disclosure are generally directed to providing a sheet conveyance device capable of switching nip portions for nipping a sheet before the trailing edge of a sheet regarding the sheet conveyance direction is completely discharged from a first nip portion.

According to an aspect of the present invention, a sheet conveyance device includes a first rotating member configured to rotate in one direction, a second rotating member configured to convey a sheet in a first direction in conjunction with the first rotating member according to the first rotating member rotating, a third rotating member configured to convey the sheet in a second direction different from the first direction in conjunction with the first rotating member according to the first rotating member rotating, and a switching unit configured to switch from a first state in which the second rotating member contacts a first surface of the sheet and the first rotating member contacts a second surface opposite to the first surface of the sheet to a second state in which the first rotating member contacts the first surface of the sheet and the third rotating member contacts the second surface of the sheet by moving the second rotating member before a trailing edge of the sheet conveyed in the first direction is conveyed by the first rotating member and the second rotating member.

Further features of the present invention will become apparent from the following description of embodiments with reference to the attached drawings.

BRIEF DESCRIPTION OF THE DRAWINGS

FIG. 24 is a schematic sectional view illustrating a sheet conveyance device in another embodiment.

DESCRIPTION OF THE EMBODIMENTS

Various embodiments, features, and aspects will be described in detail below with reference to the drawings. Furthermore, in the following embodiments, an example using a laser beam printer equipped with a sheet conveyance device is described. However, constituent elements described in the embodiments are merely illustrated as examples, and should not be construed to limit the scope of the present disclosure.

Figure 1:
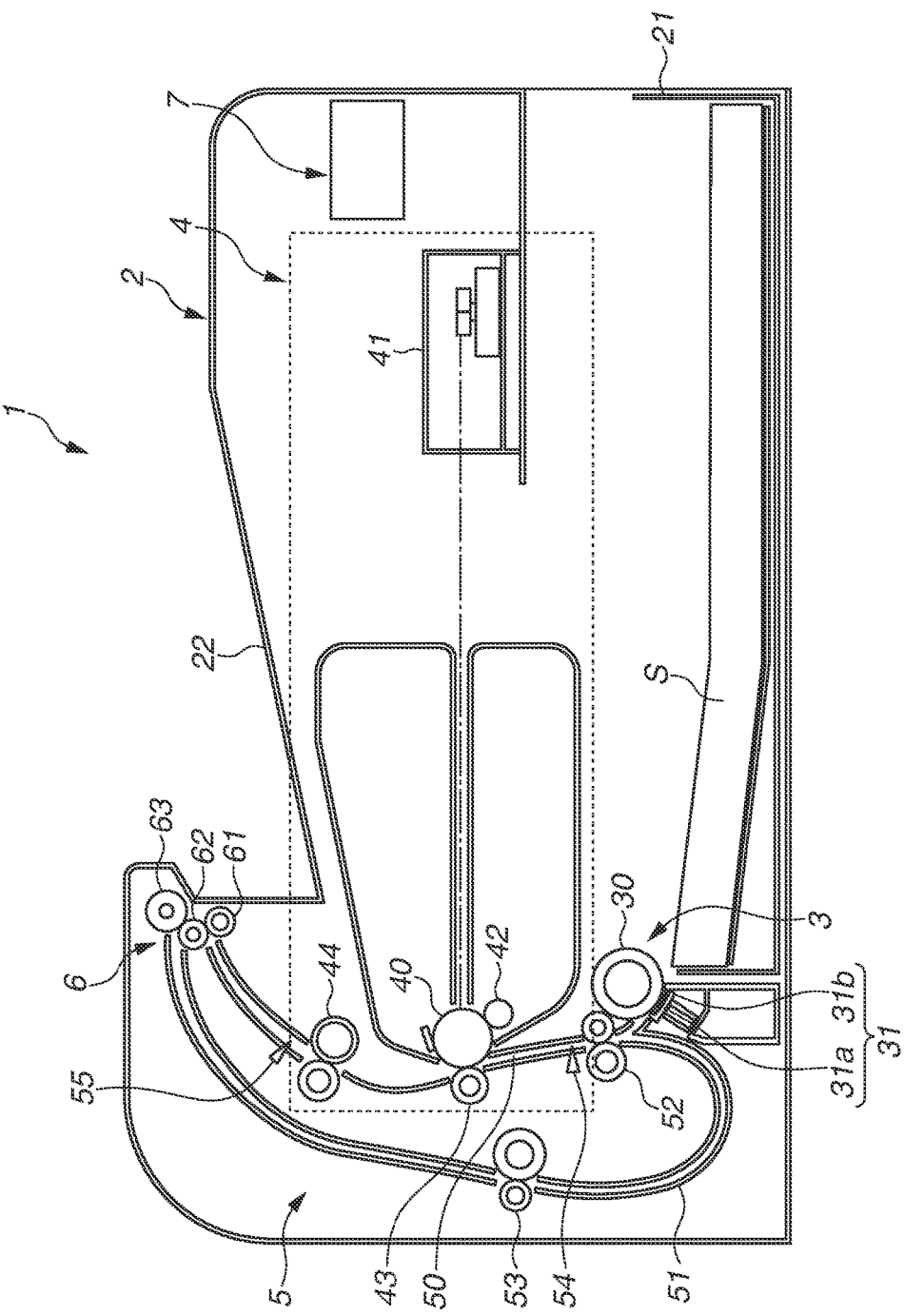
FIG. 1 is a schematic sectional view illustrating an overall configuration of an image forming apparatus according to a first embodiment.

FIG. 1 is a schematic sectional view illustrating an overall configuration of an image forming apparatus 1 equipped with a sheet conveyance device according to a first embodiment. As illustrated in FIG. 1, the image forming apparatus 1 includes a main body 2 of the image forming apparatus 1, a feeding portion 3, an image forming portion 4, a conveyance portion 5, a reversing unit 6, and a control unit 7.

The main body 2 contains the feeding portion 3, the image forming portion 4, the conveyance portion 5, the reversing unit 6, and the control unit 7. A sheet feeding cassette 21, which serves as a container portion, is detachably provided at the upstream side of the feeding portion 3 regarding the sheet conveyance direction, and feeds sheets S, which are unprinted and are contained in a stacked state, to the feeding portion 3. A sheet discharge tray 22, which serves as a stacking portion on which to stack sheets finished with printing and discharged from the main body 2, is provided at the downstream side of the reversing unit 6 regarding the sheet conveyance direction.

The feeding portion 3 includes a feed roller 30 and a separation portion 31, which is configured with a separation pad 31a and a separation holder 31b that holds the separation pad 31a. The separation pad 31a is in pressed contact with the feed roller 30, and sheets S contained in the sheet feeding cassette 21 are fed to the separation portion 31 by the rotation of the feed roller 30 and, after being separated one by one at the separation portion 31, are fed to a first conveyance path 50.

The image forming portion 4 includes a photosensitive drum 40, which serves as an image bearing member, a laser scanner unit 41, a developing portion 42, a transfer roller 43, and a fixing portion 44. The laser scanner unit 41 irradiates the photosensitive drum 40, which is uniformly charged by a charging device (not illustrated), with a laser based on image information, so that an electrostatic latent image is formed on the surface of the photosensitive drum 40. The developing portion 42 develops the electrostatic latent image with toner, so that a toner image is formed on the surface of the photosensitive drum 40. The toner image obtained by development is transferred onto the sheet S by the transfer roller 43 and is then heated and pressed at the fixing portion 44 to be fixed onto the sheet S. In this way, an image is formed on the sheet S at the image forming portion 4.

Figure 2:
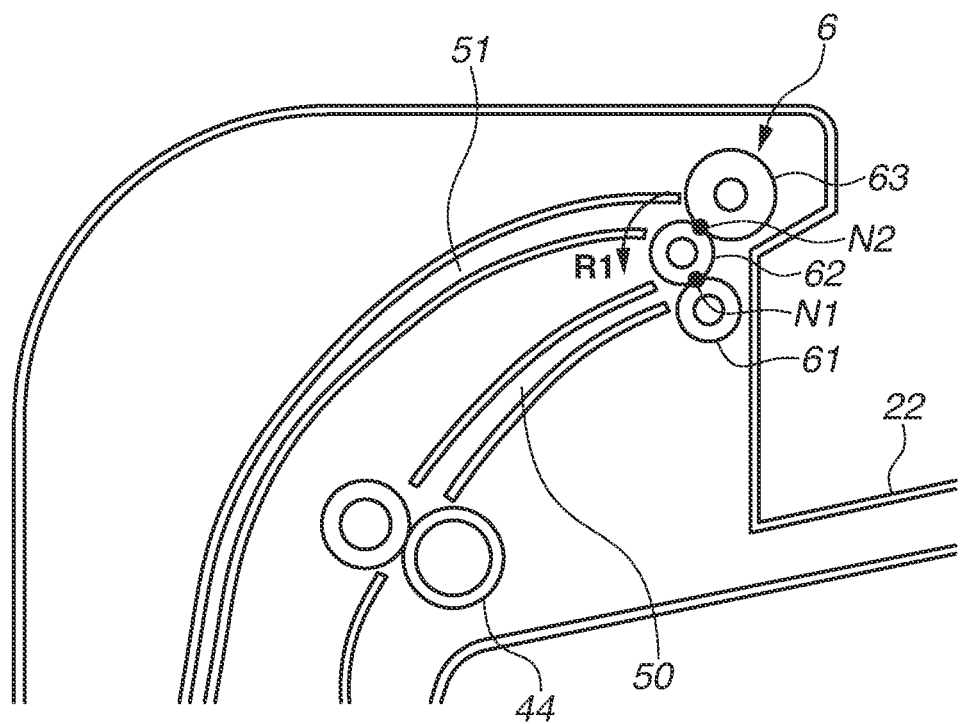
FIG. 2 is a schematic sectional view illustrating a reversing unit in the first embodiment.

FIG. 2 is a schematic sectional view illustrating a configuration of the reversing unit 6 in the present embodiment. The configuration of the reversing unit 6 is described as follows with reference to FIG. 2. The reversing unit 6 includes a driving roller 62 (a first rotating member) which receives driving force from a drive source to rotate only in one direction (a direction of arrow R1 in FIG. 2), a sheet discharge roller 61 (a second rotating member) which is driven by the rotation of the driving roller 62, and a reversing roller 63 (a third rotating member).

The sheet discharge roller 61 abuts on the driving roller 62 to form a first nip portion N1, and, at the first nip portion N1, the sheet discharge roller 61 nips and conveys the sheet S in conjunction with the driving roller 62. Moreover, the reversing roller 63 abuts on the driving roller 62 at a position different from that of the sheet discharge roller 61 regarding a circumferential direction of the driving roller 62 to form a second nip portion N2, and nips and conveys the sheet S in conjunction with the driving roller 62.

According to the driving roller 62 rotating, the sheet S is conveyed by the driving roller 62 and the sheet discharge roller 61 from the driving roller 62 toward the sheet discharge tray 22, thus being discharged from the first nip portion N1. Herein, the direction in which the sheet S is discharged from the first nip portion N1 toward the sheet discharge tray 22 (a paper discharging tray) is referred to as a "discharge direction" (a first direction). Moreover, since the driving roller 62 receives driving force to rotate only in one direction, at the second nip portion N2, the sheet S is conveyed from the sheet discharge tray 22 toward a second conveyance path 51, thus being conveyed in a reverse direction (a second direction), which is a direction different from the conveyance direction in the first nip portion N1. Herein, the second direction is a direction in which the sheet S discharged toward the sheet discharge tray in the discharge direction is conveyed from the sheet discharge tray 22 toward the reversing unit 6.

More specifically, according to the driving roller 62 rotating only in one direction (the direction of arrow R1 in FIG. 2), at the first nip portion N1, the sheet S is conveyed in the first direction, and, at the second nip portion N2, the sheet S is conveyed in the second direction, which is a direction opposite to the first direction. Moreover, according to the reversing unit 6 moving the sheet discharge roller 61, the sheet S is switched from a state of being nipped at the first nip portion N1 to a state of being nipped at the second nip portion N2. The operation of moving the sheet discharge roller 61 to switch the nipped state of the sheet S is described below in detail.

As illustrated in FIG. 1, the conveyance portion includes the first conveyance path 50, the second conveyance path 51, a conveyance roller pair 52, a re-conveyance roller pair 53, a first sensor 54, and a second sensor 55.

The first conveyance path 50 is a conveyance path through which to convey the sheet S to the image forming portion 4 so as to form an image on the sheet S fed from the sheet feeding cassette 21 or to re-form an image on the sheet S conveyed by the reversing unit 6 in the reverse direction. With regard to the conveyance direction of the sheet S, the downstream side of the first conveyance path 50 is connected to the first nip portion N1 of the reversing unit 6, and the upstream side of the first conveyance path 50 is forked in two branches. One branch of the forked first conveyance path 50 is connected to the sheet feeding cassette 21, the sheet S is fed from the sheet feeding cassette 21 to the first conveyance path 50, and a toner image is transferred to the sheet S by the transfer roller 43 at the image forming portion 4. Moreover, the other branch of the forked first conveyance path 50 is connected to the second conveyance path 51. The second conveyance path 51 is a conveyance path through which to re-convey the sheet S conveyed by the reversing unit 6 in the reverse direction to the first conveyance path 50. With regard to the sheet conveyance direction, the upstream side of the second conveyance path 51 is connected to the second nip portion N2 of the reversing unit 6, and the downstream side of the second conveyance path 51 is connected to the other branch of the forked first conveyance path 50.

The conveyance roller pair 52 is located in the first conveyance path 50, and conveys the sheet S, which is to be fed or conveyed to the first conveyance path 50, along the first conveyance path 50. The re-conveyance roller pair 53 is located in the second conveyance path 51, and conveys the sheet S conveyed to the second conveyance path 51 to the first conveyance path 50.

The first sensor 54 is located between the feeding portion 3 and the image forming portion 4 in the first conveyance path 50, and detects the position of the leading edge or trailing edge of the sheet S passing the first sensor 54. The second sensor 55 is located at the downstream side of the first conveyance path 50 regarding the sheet conveyance direction, and detects the position of the leading edge or trailing edge of the sheet S passing the second sensor 55 as with the first sensor 54. Each of the first sensor 54 and the second sensor 55 in the present embodiment includes a sensor flag (not illustrated) which is urged in a direction to abut on the sheet S and is rotated by passing of the sheet S and a photo-interrupter (not illustrated) serving as an optical sensor. With such a configuration, according to the sheet S passing, the sensor flag is pushed down and rotated to close or open a detection area of the photo-interrupter, thus allowing detecting the leading edge or trailing edge of the sheet S.

Furthermore, while, in the present embodiment, a sensor provided with a sensor flag which is rotated by passing of the sheet S is used as the first sensor 54 and the second sensor 55, the sensor for detecting the leading edge or trailing edge of the sheet S is not limited to such a sensor. For example, an optical-type sensor which detects the presence or absence of the sheet S by illuminating the sheet S with light from a light-emitting element and receiving transmitted light or reflected light at a light-receiving element can be used as the first sensor 54 and the second sensor 55.

The control unit 7 performs control of driving concerning the conveyance of the sheet S on, for example, the feed roller 30, the conveyance roller pair 52, the re-conveyance roller pair 53, and the reversing unit 6 and control of operation concerning the movement of the sheet discharge roller 61 in the reversing unit 6. The control operation of the control unit 7 over the operation of the reversing unit 6 is described below in detail.

Figure 3A:
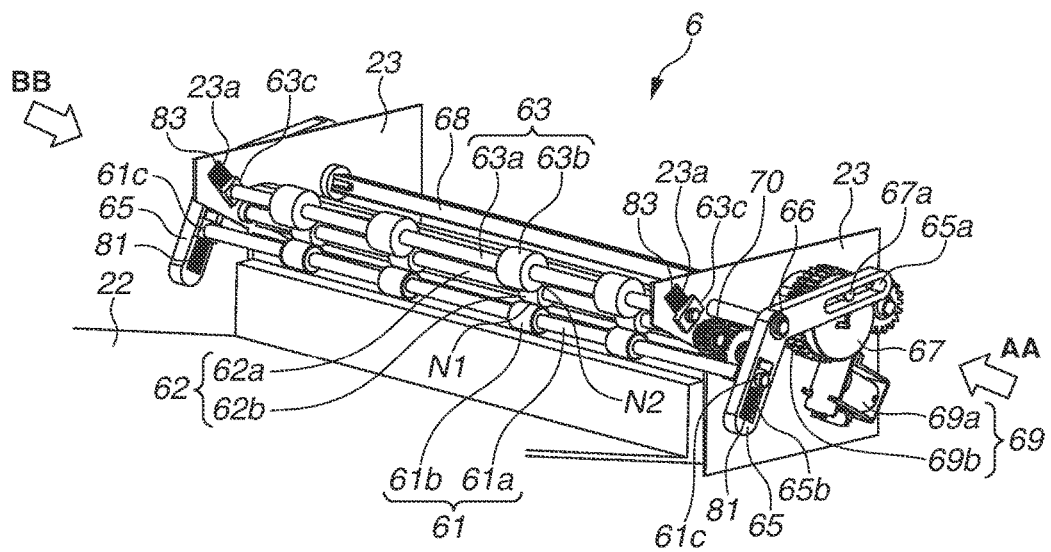
FIGS. 3A and 3B are schematic views illustrating a configuration of the reversing unit in the first embodiment.
Figure 3B:
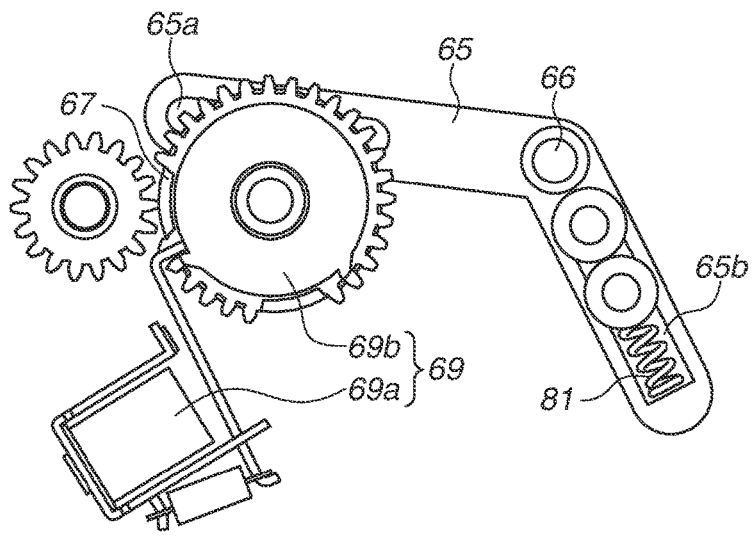
Figure 4:
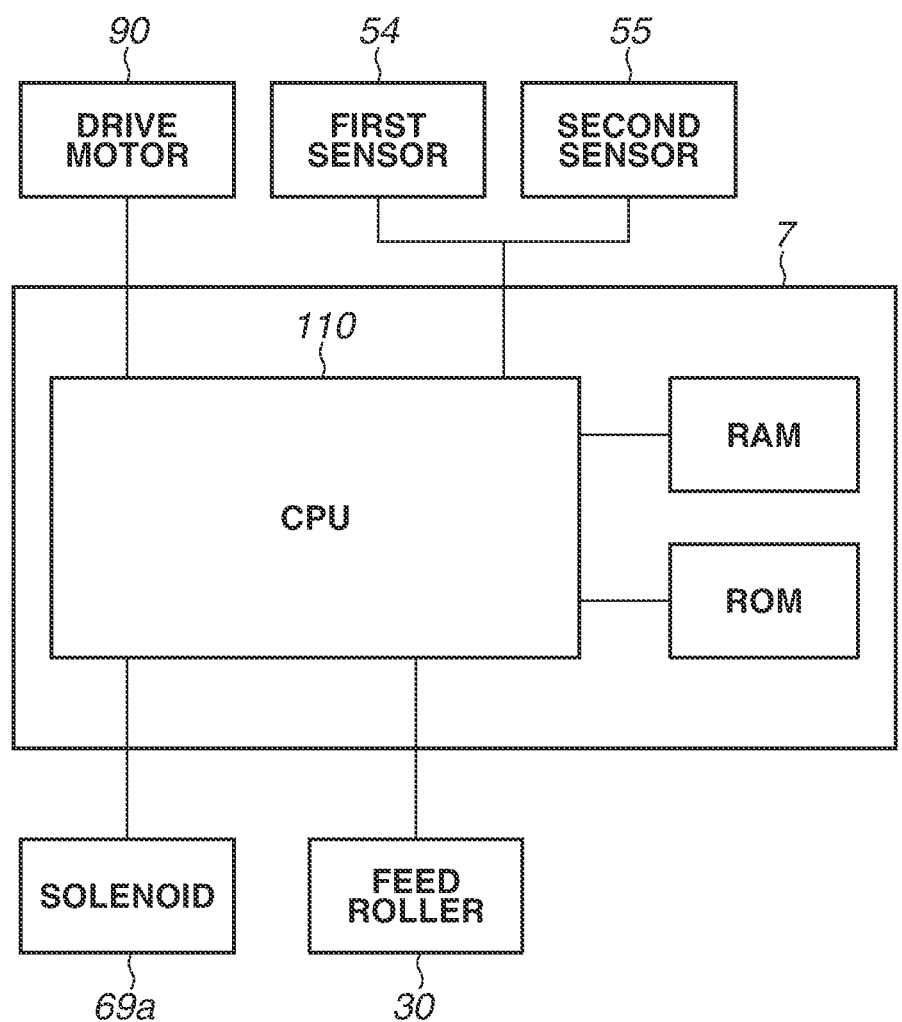
FIG. 4 is a block diagram of the image forming apparatus in the first embodiment.

Next, a configuration of the reversing unit 6 in the present embodiment is described with reference to FIGS. 3A and 3B and FIG. 4. FIG. 3A is a schematic view illustrating the configuration of the reversing unit 6 in the present embodiment as viewed from the downstream side regarding the sheet conveyance direction, and FIG. 3B is a schematic view illustrating a configuration of a cam driving portion 69 of the reversing unit 6 in the present embodiment. Moreover, FIG. 4 is a block diagram illustrating a relationship between the control unit 7 and drive sources and switchover members.

As illustrated in FIG. 3A, the driving roller 62 is configured with a shaft 62a and a rubber portion 62b, and, similarly, the reversing roller 63 is configured with a shaft 63a and a rubber portion 63b. Moreover, the sheet discharge roller 61 is configured with a shaft 61a and a roller 61b made from synthetic resin. Furthermore, while, in the present embodiment, the roller 61b is formed on the shaft 61a as the sheet discharge roller 61, the shaft 61a and the roller 61b can be formed integrally with each other.

In the reversing unit 6, the driving roller 62 is held by a frame 23 of the main body 2 in such a way as to be rotatable. A sheet discharge roller holder 65 is able to turn around a fulcrum point 66, and the sheet discharge roller 61 is held in a rotatable manner at each end thereof by a sheet discharge roller bearing 61c provided in a fitting groove 65b of the sheet discharge roller holder 65. Moreover, the sheet discharge roller 61 is urged by a spring 81 (a first urging member) toward the driving roller 62 via the sheet discharge roller bearing 61c, and the first nip portion N1 is formed by the driving roller 62 being pressed by the sheet discharge roller 61. The sheet discharge roller holder 65 is provided with the fitting groove 65b, which holds the sheet discharge roller 61, at one end side thereof and a guide groove 65a at the other end side thereof across the fulcrum point 66.

The reversing roller 63 is held in a rotatable manner by a reversing roller bearing 63c, which is held in a movable manner along a guide hole 23a provided in the frame 23 of the main body 2. The reversing roller 63 is urged by a spring 83 (a second urging member) toward the driving roller 62 via the reversing roller bearing 63c, and the second nip portion N2 is formed by the driving roller 62 being pressed by the reversing roller 63.

Both ends of a cam shaft 68, which is provided opposite to and approximately in parallel with the driving roller 62, are provided with cams 67, which are rotatable integrally with the cam shaft 68, via the frame 23. The cam 67 has a cylindrical projection portion 67a on a surface thereof different from a surface thereof on which the cam shaft 68 is held, and the projection portion 67a is fitted in the guide groove 65a, so that the cam 67 is held by the sheet discharge roller holder 65. Moreover, one end side of the cam shaft 68 is provided with a cam driving portion 69, configured with a solenoid 69a (a switchover member) and a partially toothed gear 69b, which is capable of switching ON and OFF of driving for rotating the cam 67.

FIG. 3B is a schematic view of the cam driving portion 69 of the reversing unit 6 as viewed from a direction BB in FIG. 3A. As illustrated in FIG. 3B, the partially toothed gear 69b is provided with two toothless portions, and the solenoid 69a is provided with a hook portion which is engageable with the toothless portion of the partially toothed gear 69b. With this, the partially toothed gear 69b is configured to rotate in increments of a predetermined angle and stop at two portions during one rotation according to the solenoid 69a being turned on and off.

Next, a block diagram of portions used to perform driving control in the present embodiment is described with reference to FIG. 4. One end side of the driving roller 62 is connected to a gear 70, and the driving roller 62 receives driving force from a drive motor 90 serving as a drive source via the gear 70 to rotate. The drive motor 90 rotates only in one direction, so that the driving roller 62 also rotates only in one direction. As illustrated in FIG. 4, a central processing unit (CPU) 110 is connected to the drive motor 90, the solenoid 69a, the feed roller 30, the first sensor 54, and the second sensor 55. Furthermore, the CPU 110 is connected to a read-only memory (ROM) and a random access memory (RAM), and executes a program stored in the ROM by using the RAM as a work memory. In the present embodiment, the CPU 110, the ROM, and the RAM configure the control unit 7. Moreover, in the present embodiment, according to the control unit 7 controlling the drive motor 90 and the solenoid 69a, in the reversing unit 6, operations of rotating the driving roller 62 and moving the sheet discharge roller 61 via the cam driving portion 69 are performed.

Figure 5A:
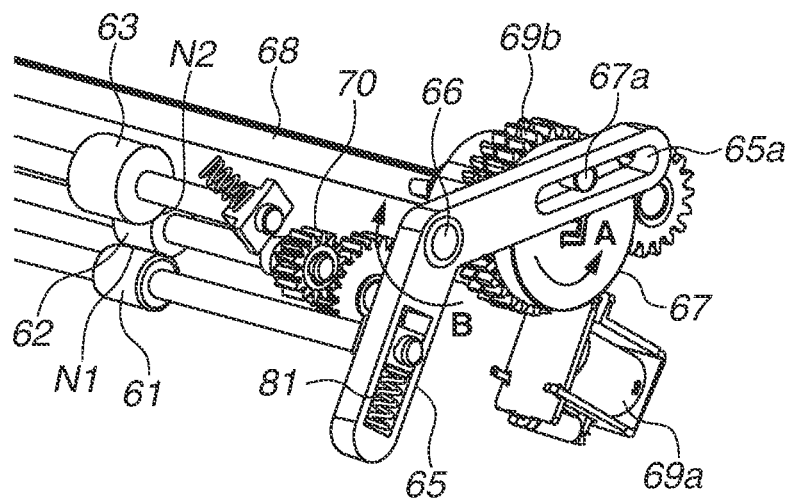
FIGS. 5A and 5B are schematic views illustrating an operation when the reversing unit moves a sheet discharge roller in the first embodiment.
Figure 5B:
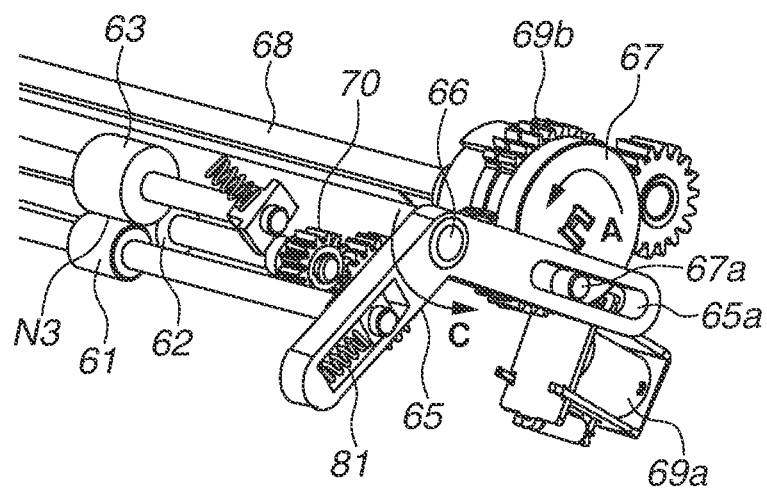
Figure 6A:
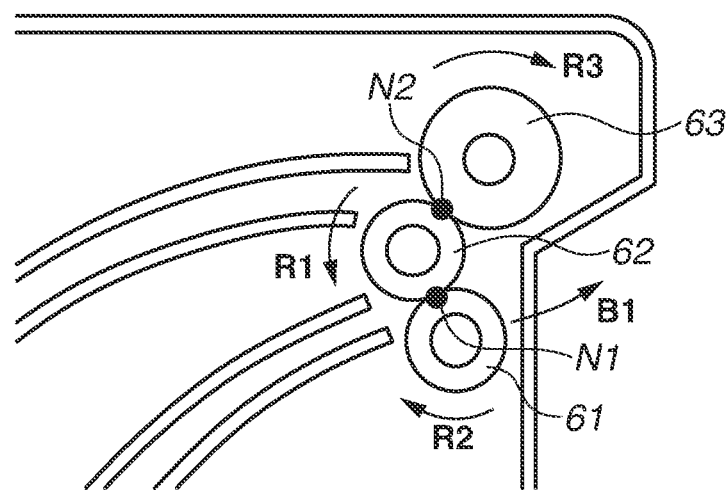
FIGS. 6A and 6B are schematic sectional views illustrating movement of the sheet discharge roller in the reversing unit in the first embodiment.
Figure 6B:
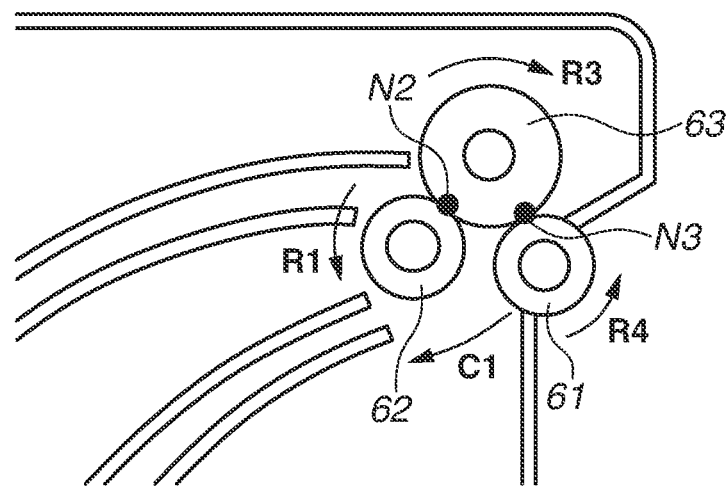

Here, the operation of moving the sheet discharge roller 61 in the reversing unit 6 is described with reference to FIGS. 5A and 5B and FIGS. 6A and 6B. FIG. 5A is a schematic view illustrating a configuration of the reversing unit 6 before the operation of moving the sheet discharge roller 61 is performed in the present embodiment, and FIG. 5B is a schematic view illustrating a configuration of the reversing unit 6 after the operation of moving the sheet discharge roller 61 is performed. Moreover, FIG. 6A is a schematic sectional view of the reversing unit 6 as viewed from the axial direction of the sheet discharge roller 61 before the operation of moving the sheet discharge roller 61 is performed, and FIG. 6B is a schematic sectional view of the reversing unit 6 as viewed from the axial direction of the sheet discharge roller 61 after the operation of moving the sheet discharge roller 61 is performed. Furthermore, FIGS. 5A and 5B are schematic views as viewed from a direction AA in FIG. 3A, and FIGS. 6A and 6B are schematic views as viewed from a direction BB in FIG. 3A.

In the state illustrated in FIG. 5A and FIG. 6A, the sheet discharge roller 61 has not yet started the operation of movement, and the position of the sheet discharge roller 61 at this time is assumed to be an initial position (a first position). As illustrated in FIG. 6A, the sheet discharge roller 61 in the initial position abuts on the driving roller 62 to form the first nip portion N1, and is rotating in the direction of arrow R2 in FIG. 6A by being driven by the driving roller 62, which is rotating in the direction of arrow R1 in FIG. 6A. Furthermore, at this time, in the second nip portion N2 formed by the reversing roller 63 and the driving roller 62, the reversing roller 63 is rotating in the direction of arrow R3 in FIG. 6A by being driven by the driving roller 62, which rotates in the direction of arrow R1 in FIG. 6A.

At this time, the hook portion of the solenoid 69a is engaged with the first toothless portion of the partially toothed gear 69b, and the partially toothed gear 69b is locked with transmission of driving stopped, so that the cam 67 remains still without rotation. In this state, when the solenoid 69a is energized to unlock the partially toothed gear 69b, driving is transmitted to the partially toothed gear 69b, so that, as illustrated in FIG. 5A, the cam 67 rotates in the direction of arrow A in FIG. 5A. Furthermore, according to rotation of the cam 67, the projection portion 67a fitted in the guide groove 65a of the sheet discharge roller holder 65 also starts rotating in the direction of arrow A in FIG. 5A. With this, the sheet discharge roller holder 65 rotates in the direction of arrow B in FIG. 5A around the fulcrum point 66, so that the sheet discharge roller 61, which is held at each side thereof by the sheet discharge roller bearing 61c provided in the sheet discharge roller holder 65, moves in a direction away from the driving roller 62. In other words, as illustrated in FIG. 6A, the sheet discharge roller 61 moves in the direction of arrow B1 in FIG. 6A, and the sheet discharge roller 61 thus moves to the downstream side of the driving roller 62 regarding the first direction, in which the sheet S is conveyed.

FIG. 5B and FIG. 6B illustrate the position of the sheet discharge roller 61 when the amount of movement of the sheet discharge roller holder 65 caused by the rotation of the cam 67 has become maximum, and the position of the sheet discharge roller 61 at this time is assumed to be a reversing position (a second position). When the partially toothed gear 69b rotates from the state illustrated in FIG. 5A and then enters the state illustrated in FIG. 5B, the second toothless portion of the partially toothed gear 69b arrives at such a position as to be engaged with the hook portion of the solenoid 69a. At this time, energization of the solenoid 69a is already stopped, the second toothless portion of the partially toothed gear 69b and the hook portion of the solenoid 69a are engaged with each other, the partially toothed gear 69b is locked with transmission of driving stopped, and the cam 67 stops rotating. With this, the rotation of the sheet discharge roller holder 65 and the movement of the sheet discharge roller 61 are stopped, so that the sheet discharge roller 61 stops in the reversing position.

As illustrated in FIG. 6B, when the sheet discharge roller 61 moves from the initial position to the reversing position, the sheet discharge roller 61 moves away from the driving roller 62, so that the first nip portion N1 is dissolved. In the reversing position, the sheet discharge roller 61 is urged toward the reversing roller 63, and the sheet discharge roller 61 and the reversing roller 63 abut on each other, so that a third nip portion N3, which nips and conveys the sheet S, is formed. In the third nip portion N3, the sheet discharge roller 61 is driven by the rotation of the reversing roller 63, and is thus rotated in a direction (the direction of arrow R4 in FIG. 6B) opposite to the rotating direction in the initial position. Furthermore, at this time, the reversing roller 63 abuts on the driving roller 62 to form the second nip portion N2, and the reversing roller 63 is rotating in the direction of arrow R3 in FIG. 6B by being driven by the driving roller 62, which is rotating in the direction of arrow R1 in FIG. 6B.

In this state, when the solenoid 69a is re-energized to unlock the partially toothed gear 69b, the cam 67 rotates further in the direction of arrow A in FIG. 5B, and the sheet discharge roller holder 65 rotates around the fulcrum point 66 in the direction of arrow C in FIG. 5B. With this, as illustrated in FIG. 6B, the sheet discharge roller 61 moves in a direction away from the reversing roller 63 (in the direction of arrow C1 in FIG. 6B), so that the third nip portion N3 is dissolved. After that, when, according to the partially toothed gear 69b rotating, the hook portion of the solenoid 69a, which has already been de-energized, engages with the first toothless portion of the partially toothed gear 69b, the cam 67 is locked at the position where transmission of driving to the partially toothed gear 69b has been canceled and thus stops rotating. At this time, the sheet discharge roller 61 stops at the initial position, so that the reversing unit 6 enters the state illustrated in FIG. 5A and FIG. 6A. As described above, a series of operations of the sheet discharge roller 61 moving in the reversing unit 6 is performed during a period in which the cam 67 is rotated one revolution by the cam driving portion 69.

Next, a conveyance operation for the sheet S during two-sided printing in the image forming apparatus 1 according to the present embodiment is described with reference to FIG. 7 to FIG. 10.

Figure 7:
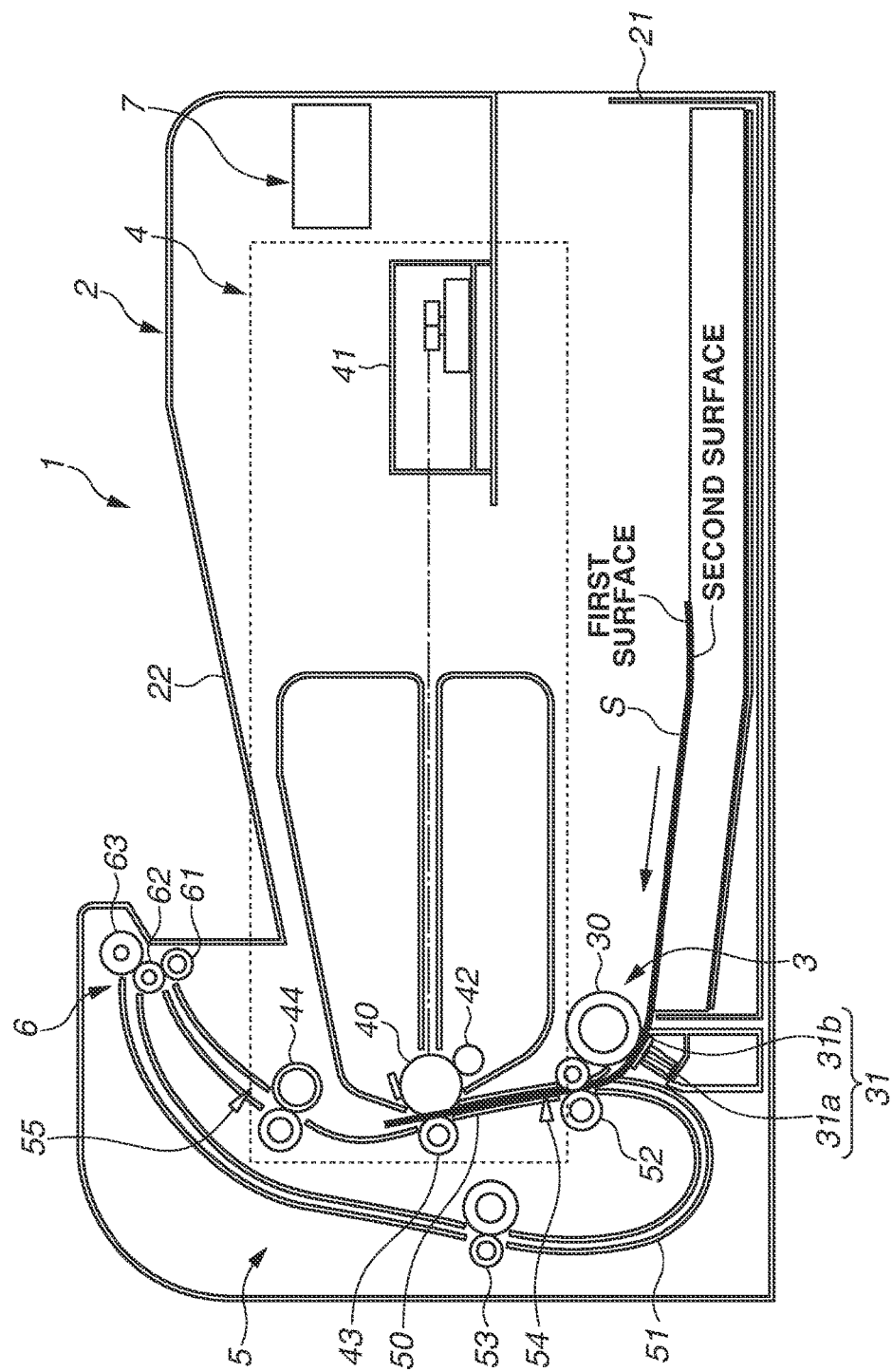
FIG. 7 is a schematic sectional view illustrating a sheet conveyance operation during two-sided printing in the first embodiment.

FIG. 7 is a schematic sectional view illustrating a state obtained after the sheet S, which has been contained in the sheet feeding cassette 21, has been fed by the feed roller 30. As illustrated in FIG. 7, the sheet S drawn by the feed roller 30 from the sheet feeding cassette 21 is fed to the first conveyance path 50 after being separated by one by one by the separation portion 31 and is then conveyed to the image forming portion 4 by the conveyance roller pair 52. Then, the leading edge of the sheet S is detected by the first sensor 54, and an image is formed on the first surface of the sheet S at the image forming portion 4 at timing which is based on the detected information.

Figure 8:
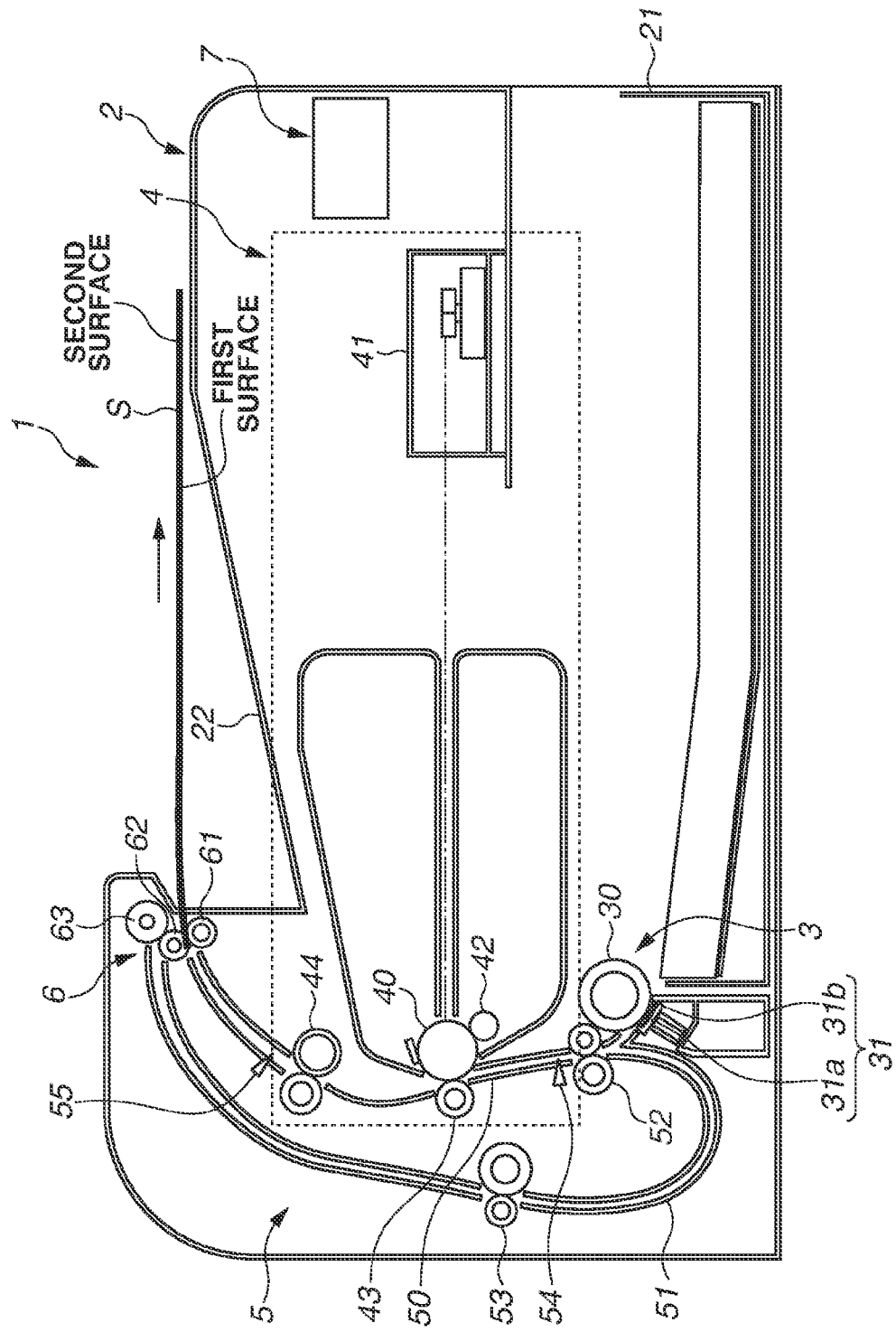
FIG. 8 is a schematic sectional view illustrating the sheet conveyance operation during two-sided printing in the first embodiment.

FIG. 8 is a schematic sectional view illustrating a state obtained immediately before the operation of movement of the sheet discharge roller 61 starts after the sheet S having an image formed on the first surface is conveyed to the reversing unit 6. The sheet S having a toner image transferred to the first surface is subjected to fixing of the toner image at the fixing portion 44 and is then conveyed in the direction of a solid arrow in FIG. 8 (the first direction) while being nipped by the first nip portion N1, which is formed by the driving roller 62 and the sheet discharge roller 61. At this time, the sheet S is conveyed in the first direction with the first surface in contact with the sheet discharge roller 61 and the second surface in contact with the driving roller 62 (in a first state).

The trailing edge of the sheet S, which is in contact with the driving roller 62 and the sheet discharge roller 61 at the first nip portion N1, is detected by the second sensor 55, and the sheet discharge roller 61 starts moving before the trailing edge of the sheet S is completely conveyed at the first nip portion N1 based on the detected information. In other words, in the present embodiment, before the trailing edge of the sheet S completely gets out of the first nip portion N1, the sheet discharge roller 61 starts moving. According to the sheet discharge roller 61 moving, the sheet S, which has been nipped at the first nip portion N1 and been conveyed in the first direction, is nipped by the second nip portion N2. The movement of the sheet discharge roller 61 is started by the control unit 7 controlling the solenoid 69a based on the detected information output from the second sensor 55. Furthermore, the movement of the sheet discharge roller 61 can be controlled in such a way as to be started based on the detected information about the leading edge of the sheet S output from the second sensor 55. The operation of moving the sheet discharge roller 61 when the sheet S is switched from the state of being nipped by the first nip portion N1 to the state of being nipped by the second nip portion N2 is described below in detail with reference to FIGS. 11A, 11B, 11C, and 11D.

Figure 9:
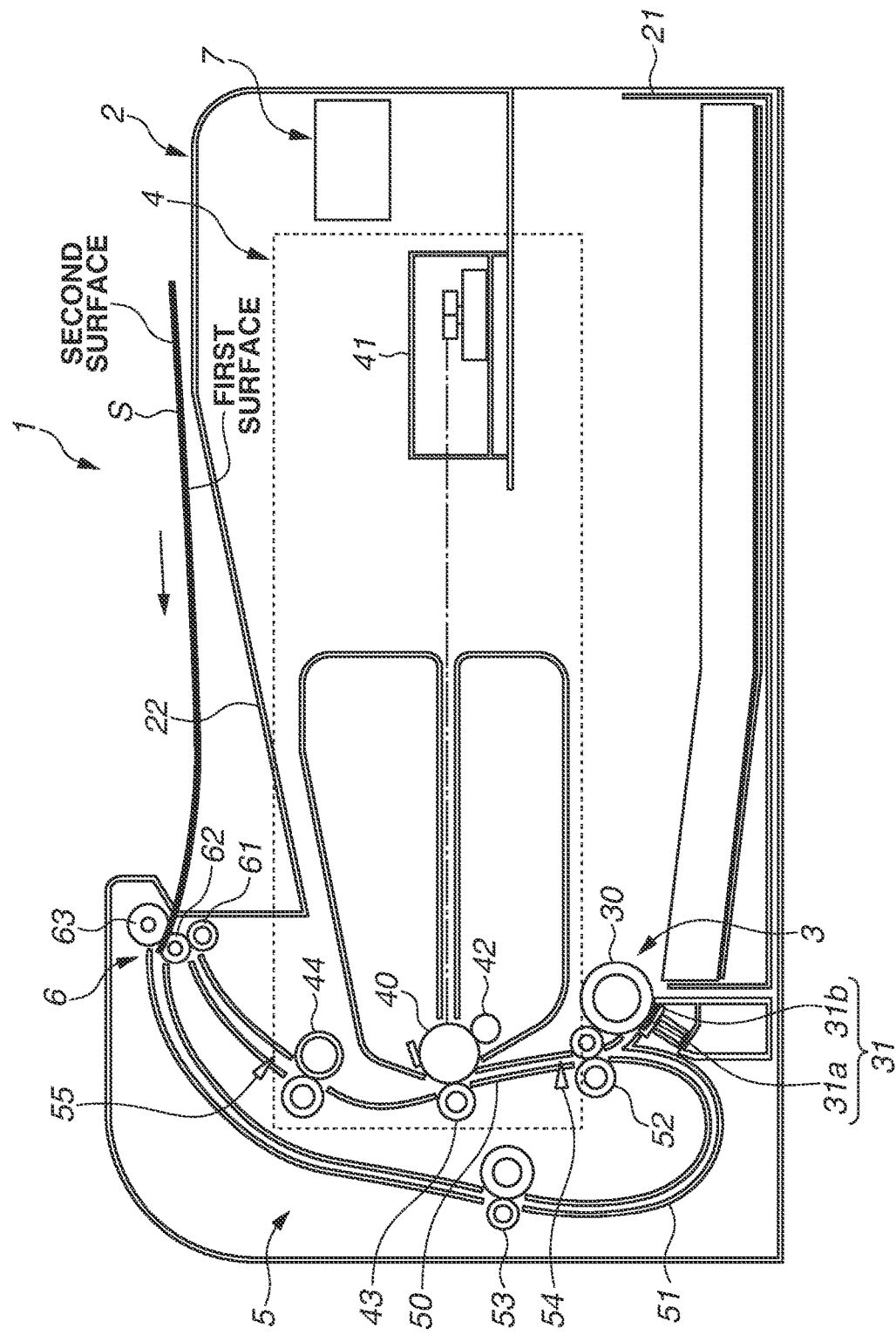
FIG. 9 is a schematic sectional view illustrating the sheet conveyance operation during two-sided printing in the first embodiment.

FIG. 9 is a schematic sectional view illustrating a state in which the sheet S is nipped at the second nip portion N2 after the operation of movement of the sheet discharge roller 61. When, according to the sheet discharge roller 61 moving, nipping of the sheet S is shifted from the first nip portion N1 to the second nip portion N2, the sheet S is conveyed at the second nip portion N2 in the direction of a solid arrow in FIG. 9 (a second direction) different from the first direction. At this time, the sheet S is conveyed in the second direction with the second surface in contact with the reversing roller 63 and the first surface in contact with the driving roller 62 (in a second state). With this, the sheet S, which has been conveyed at the first nip portion N1 in the first direction, is conveyed at the second nip portion N2 in the second direction and is then conveyed to the second conveyance path 51.

Figure 10:
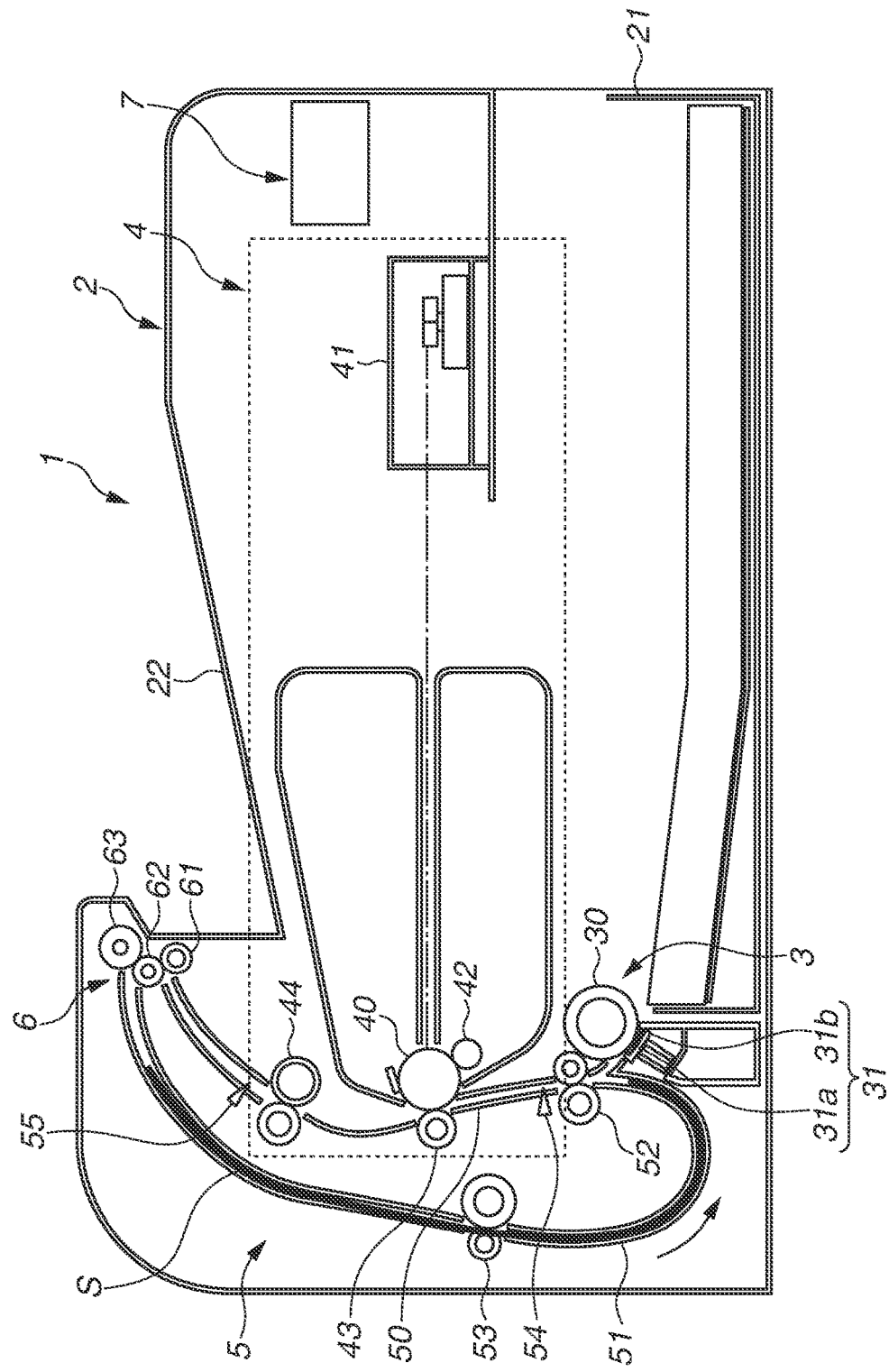
FIG. 10 is a schematic sectional view illustrating the sheet conveyance operation during two-sided printing in the first embodiment.

FIG. 10 is a schematic sectional view illustrating a state obtained immediately before the sheet S conveyed in the second direction is re-conveyed to the image forming portion 4. As illustrated in FIG. 10, the sheet S conveyed to the second conveyance path 51 is conveyed by the re-conveyance roller pair 53 to the first conveyance path 50. After that, in the sheet S, a toner image is transferred by the transfer roller 43 to the second surface at the image forming portion 4 and the toner image formed on the second surface is fixed at the fixing portion 44, so that images are formed on the two sides, the first surface and the second surface, of the sheet S. The sheet S having images completely formed on the two sides thereof is conveyed to the reversing unit 6 and is then re-conveyed in the first direction at the first nip portion N1, so that, this time, the sheet S is discharged to the sheet discharge tray 22 without movement of the sheet discharge roller 61. In this way, two-sided printing on the sheet S in the present embodiment is completed.

In the above-described way, in the present embodiment, since the sheet discharge roller 61 is moved by a switching unit including the sheet discharge roller holder 65, the cam 67, the cam shaft 68, and the cam driving portion 69, the state of nipping of the sheet S is switched from the first state to the second state. Next, the operation of movement of the sheet discharge roller 61 when the sheet S is switched by the switching unit from the first state of being nipped by the first nip portion N1 to the second state of being nipped by the second nip portion N2 in the reversing unit 6 is described with reference to FIGS. 11A, 11B, 11C, and 11D.

Figure 11A:
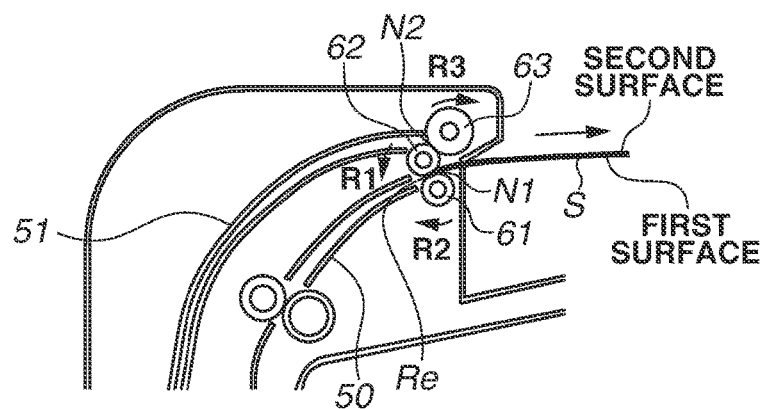
FIGS. 11A, 11B, 11C, and 11D are schematic views illustrating an operation of movement of a driving roller in the first embodiment.

FIG. 11A is a schematic view illustrating a state obtained immediately before the operation of movement of the sheet discharge roller 61 starts after the sheet S having an image formed on the first surface thereof is conveyed to the first nip portion N1. At this time, the sheet discharge roller 61 in the initial position (first position) is rotating in the direction of arrow R2 in FIG. 11A by receiving rotative force from the driving roller 62, which is rotating in the direction of arrow R1 in FIG. 11A. Moreover, the sheet S is conveyed at the first nip portion N1 in the first direction in the first state in which the first surface is in contact with the sheet discharge roller 61 and the second surface is in contact with the driving roller 62. In the present embodiment, as illustrated in FIG. 11A, before the trailing edge Re of the sheet S is conveyed at the first nip portion N1, the sheet discharge roller 61 starts moving in a direction away from the driving roller 62. Herein, the trailing edge Re of the sheet S in the present embodiment refers to the rearmost portion of the sheet S regarding the first direction in which the sheet S is conveyed.

Figure 11B:
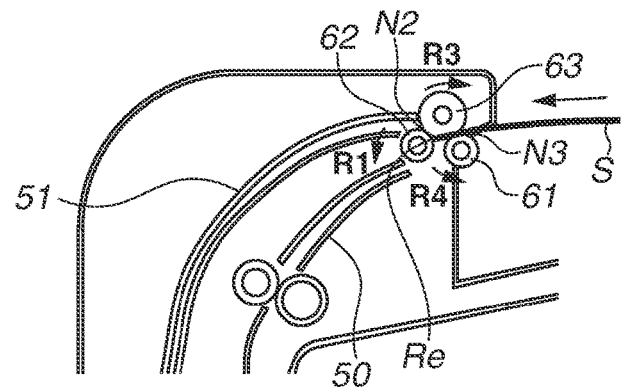

FIG. 11B is a schematic view illustrating a state of the sheet S obtained when the sheet discharge roller 61 has moved to the reversing position (second position). As illustrated in FIG. 11B, when the sheet discharge roller 61 moves from the initial position to the reversing position, the first nip portion N1, which is formed by the driving roller 62 and the sheet discharge roller 61, is dissolved and the third nip portion N3 is formed by the sheet discharge roller 61 and the reversing roller 63. The sheet S, which has been conveyed at the first nip portion N1 in the first direction, is raised upward by the movement of the sheet discharge roller 61 and is then nipped by the third nip portion N3 with the first surface in contact with the sheet discharge roller 61 and the second surface in contact with the reversing roller 63. At this time, the sheet discharge roller 61 rotates in the direction of arrow R4 in FIG. 11B by being driven by the reversing roller 63, which rotates in the direction of arrow R3 in FIG. 11B, so that the sheet S is conveyed at the third nip portion N3 in a direction toward the second nip portion N2.

Figure 11C:
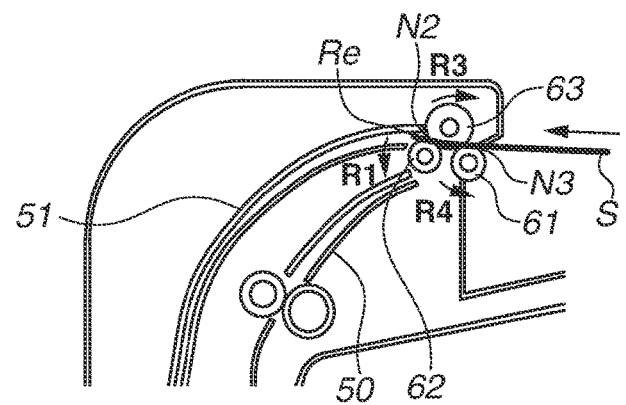

FIG. 11C is a schematic view illustrating a state in which the sheet S conveyed from the third nip portion N3 toward the second nip portion N2 has been nipped at the second nip portion N2. As illustrated in FIG. 11B, the trailing edge Re of the sheet S nipped at the third nip portion N3 has moved up by being raised by the sheet discharge roller 61 moved to the reversing position. When, in such a state, the sheet S is conveyed by the reversing roller 63 and the sheet discharge roller 61 at the third nip portion N3, as illustrated in FIG. 11C, the sheet S is conveyed in the second direction while being nipped at two portions, i.e., the second nip portion N2 and the third nip portion N3. At this time, the first surface of the sheet S is in contact with the sheet discharge roller 61 and the driving roller 62, and the second surface of the sheet S is in contact with the reversing roller 63.

Figure 11D:
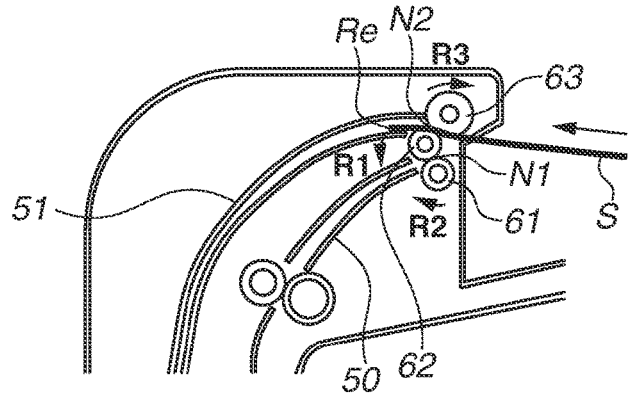

FIG. 11D is a schematic view illustrating a state of the sheet S when the sheet discharge roller 61 has moved from the reversing portion to the initial position. As illustrated in FIG. 11D, according to the sheet discharge roller 61 moving to the initial position, the third nip portion N3 is dissolved and the first nip portion N1 is re-formed. At this time, the sheet S is nipped at the second nip portion N2 and is then conveyed in the second direction with the first surface in contact with the driving roller 62 and the second surface in contact with the reversing roller 63. In other words, the sheet S, which has been conveyed at the first nip portion N1 in the first direction, is nipped at the second nip portion N2 according to the sheet discharge roller 61 moving, and is then conveyed at the second nip portion N2 in the second direction.

In this way, in the present embodiment, before the trailing edge Re of the sheet S, which is conveyed at the first nip portion N1 in the first direction, is conveyed at the first nip portion N1, the sheet discharge roller 61 is moved by the switching unit. With this, a nip portion which nips the sheet S can be switched from the first nip portion N1 to the second nip portion N2, and the sheet S can be reversed by changing the conveyance direction for conveying the sheet S from the first direction to the second direction.

Furthermore, in the present embodiment, when conveying the sheet S, the driving roller 62 constantly rotates only in one direction. With this, since the reversing unit 6 in the present embodiment is not required to switch the rotating direction of the driving roller 62 when conveying the sheet S in the second direction, a mechanism for changing the rotating direction of the driving roller 62 is unnecessary.

Next, a conveyance operation for the sheets S when two-sided printing is continuously performed on two or more sheets is described with reference to FIG. 12 to FIG. 19. Furthermore, the first sheet which is fed from the sheet feeding cassette 21 is referred to as a "first sheet S1" and the second sheet which is a sheet following the first sheet S1 is referred to as a "second sheet S2", and, similarly, the third sheet is referred to as a "third sheet S3" and the fourth sheet is referred to as a "fourth sheet S4".

Figure 12:
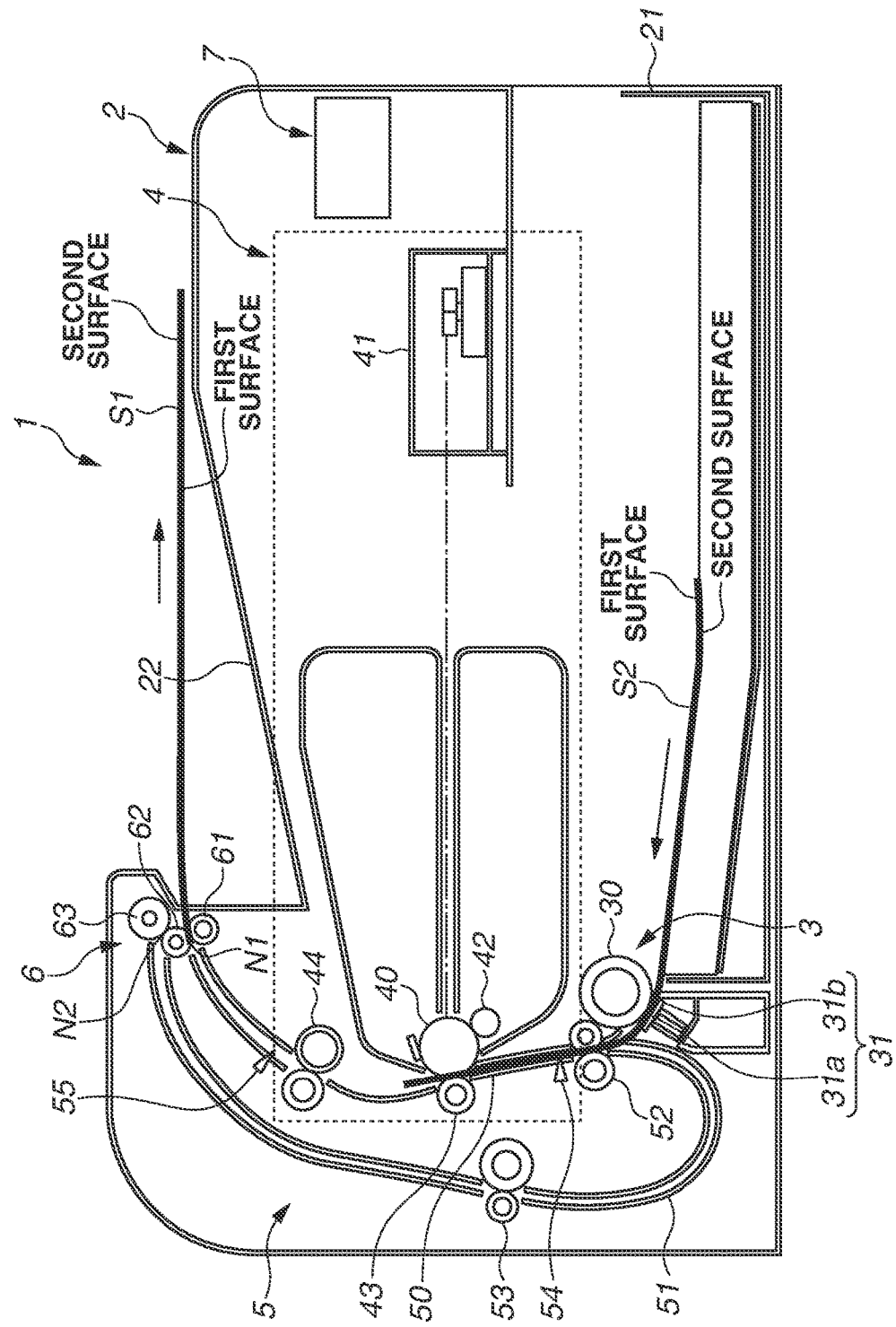
FIG. 12 is a schematic sectional view illustrating a sheet conveyance operation during continuous two-sided printing in the first embodiment.

FIG. 12 is a schematic sectional view illustrating a state obtained immediately before the first sheet S1 moves from the first nip portion N1 to the second nip portion N2 according to the operation of movement of the sheet discharge roller 61 after image formation on the first surface of the first sheet S1 conveyed by the feed roller 30 from the sheet feeding cassette 21 is completed. In the case of continuously performing two-sided printing, the operation of feeding the second sheet S2 is started at a predetermined interval from the trailing edge of the first sheet S1. In the present embodiment, when the first sheet S1 moves from the first nip portion N1 to the second nip portion N2 according to the operation of movement of the sheet discharge roller 61, the second sheet S2 has already been fed by the feed roller 30 and the first surface thereof has already been subjected to transfer of a toner image thereon at the image forming portion 4.

Figure 13:
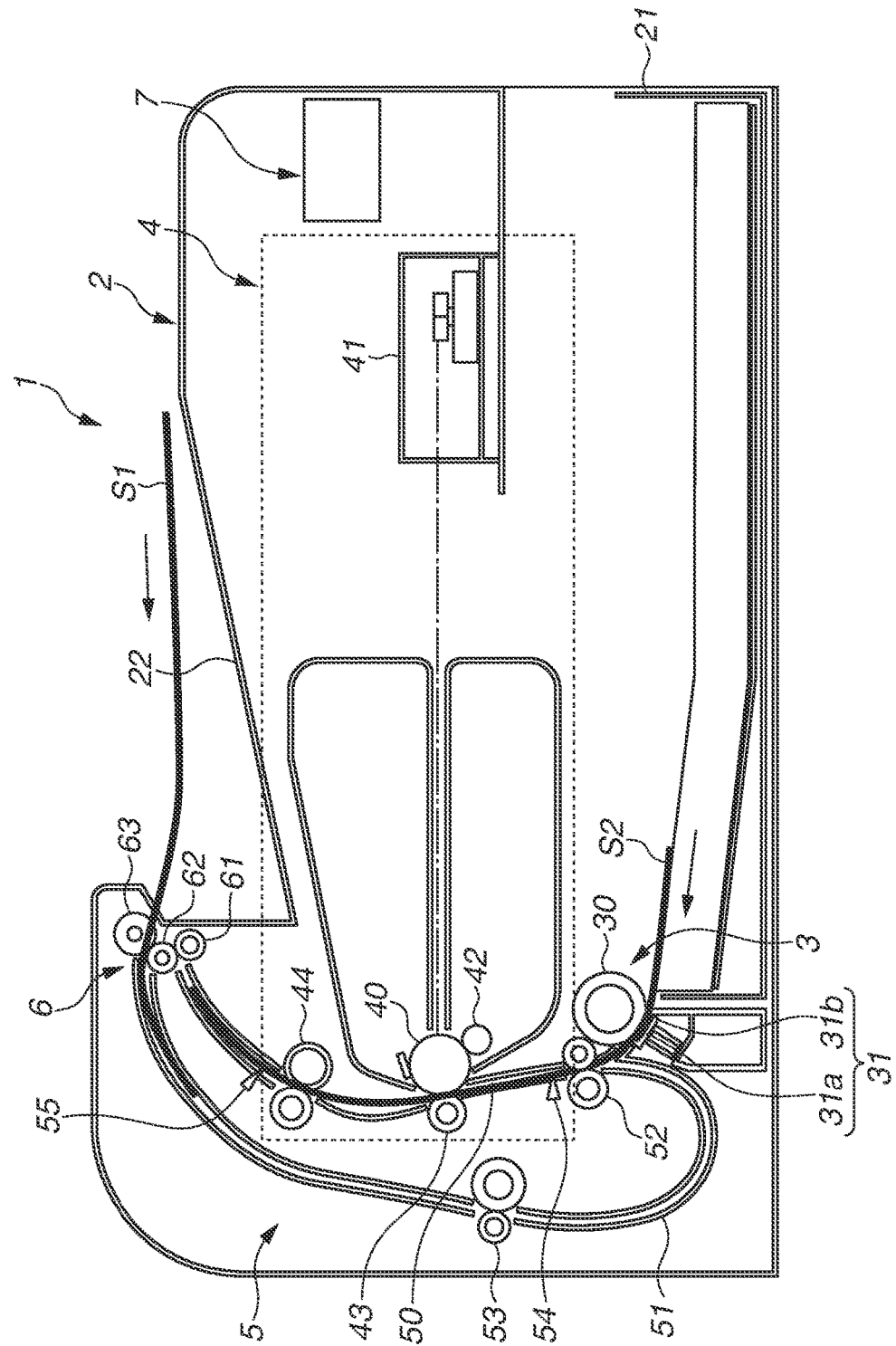
FIG. 13 is a schematic sectional view illustrating the sheet conveyance operation during continuous two-sided printing in the first embodiment.

FIG. 13 is a schematic sectional view illustrating a state in which the first sheet S1 is nipped by the second nip portion N2 according to the movement of the sheet discharge roller 61 in the reversing unit 6 and is conveyed at the second nip portion N2 in the second direction. When the first sheet S1, which has been nipped at the first nip portion N1, is nipped by the second nip portion N2 according to the movement of the sheet discharge roller 61, the first sheet S1 is conveyed at the second nip portion N2 in the second direction and is then conveyed to the second conveyance path 51. In the present embodiment, since the first sheet S1, which has been nipped at the first nip portion N1, is nipped by the second nip portion N2 according to the movement of the sheet discharge roller 61, the first nip portion N1, at which the first sheet S1 has been conveyed, can be made vacant. With this, in the process of the first sheet S1 being conveyed in the second direction, the second sheet S2, which is a sheet following the first sheet S1, can be conveyed to the first nip portion N1 in the reversing unit 6.

When the second sheet S2 is conveyed to the first nip portion N1 from the state illustrated in FIG. 13, the second nip portion N2 enters a state in which the first sheet S1 is conveyed in the second direction and the first nip portion N1 enters a state in which the second sheet S2 is conveyed in the first direction. In other words, in the reversing unit 6, the first sheet S1 and the second sheet S2 are conveyed while crossing each other (hereinafter referred to as "cross-conveyed").

Figure 14:
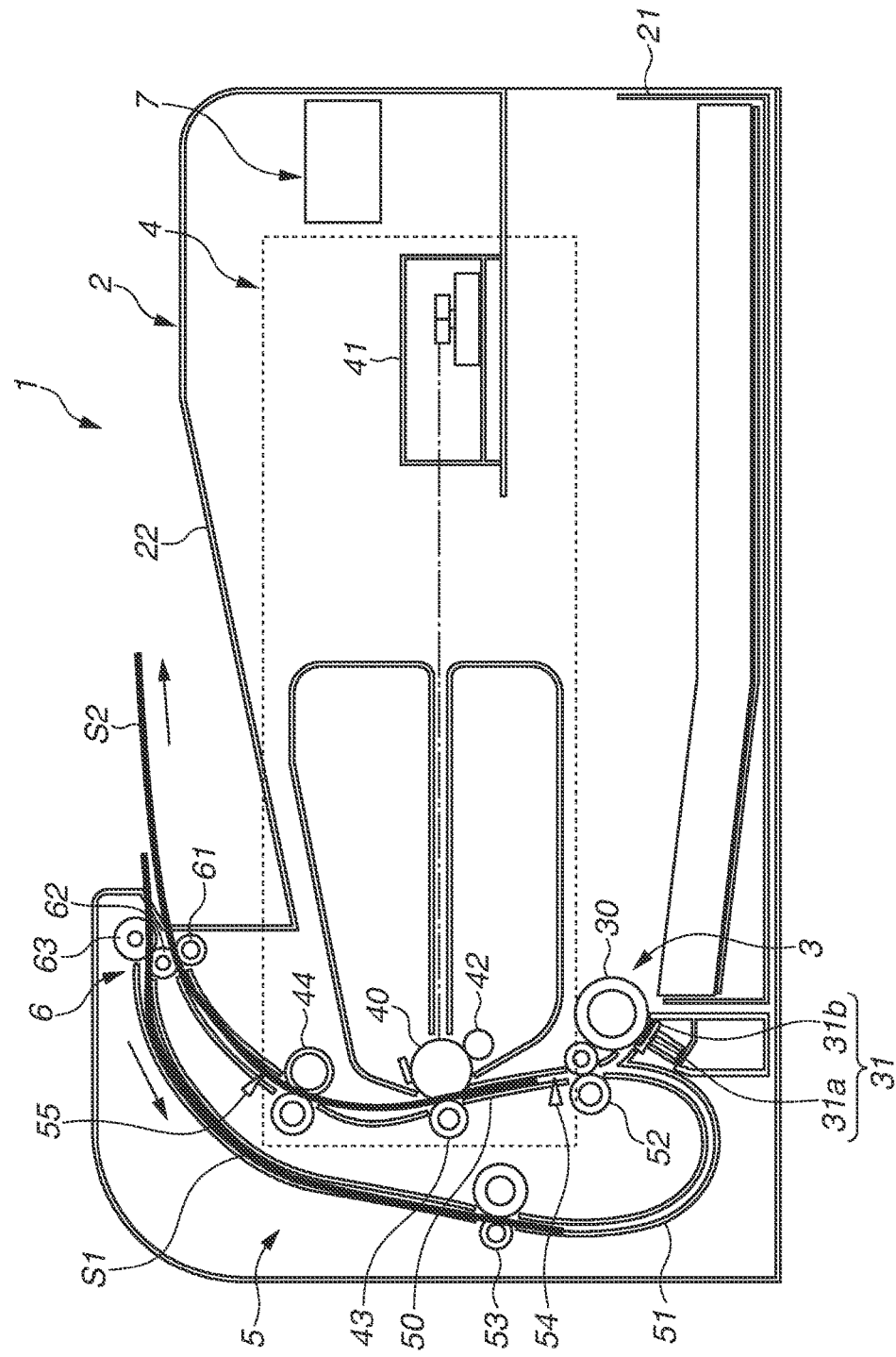
FIG. 14 is a schematic sectional view illustrating the sheet conveyance operation during continuous two-sided printing in the first embodiment.

FIG. 14 is a schematic sectional view illustrating a state obtained before the first sheet S1 is re-conveyed from the second conveyance path 51 to the first conveyance path 50. In the state illustrated in FIG. 14, the second sheet S2 is being conveyed at the first nip portion N1 in the first direction, and the trailing edge of the second sheet S2 has already passed the position at which the first conveyance path 50 and the second conveyance path 51 join together. Accordingly, the leading edge of the first sheet S1, which is a preceding sheet, does not collide with the trailing edge of the second sheet S2, which is a subsequent sheet, and the first sheet S1 is re-conveyed to the first conveyance path 50 at a predetermined interval from the second sheet S2.

Figure 15:
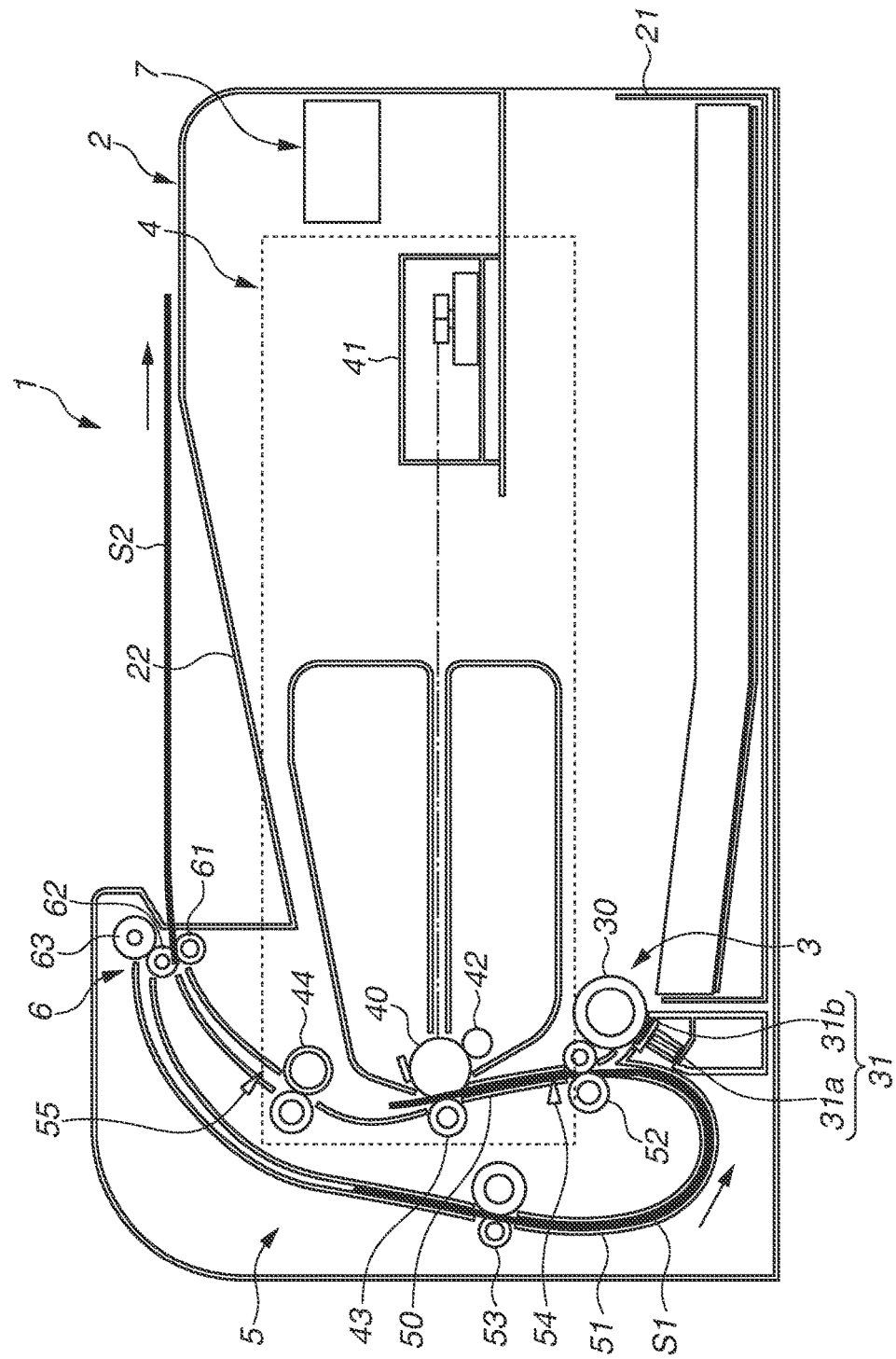
FIG. 15 is a schematic sectional view illustrating the sheet conveyance operation during continuous two-sided printing in the first embodiment.

FIG. 15 is a schematic sectional view illustrating a state obtained immediately before the second sheet S2 with image formation on the first surface thereof completed moves from the first nip portion N1 to the second nip portion N2 according to the movement of the sheet discharge roller 61. At this time, the first sheet S1, which has been re-conveyed to the first conveyance path 50 at a predetermined interval from the trailing edge of the second sheet S2, is conveyed to the image forming portion 4, so that a toner image is transferred to the second surface of the first sheet S1 at the image forming portion 4.

Figure 16:
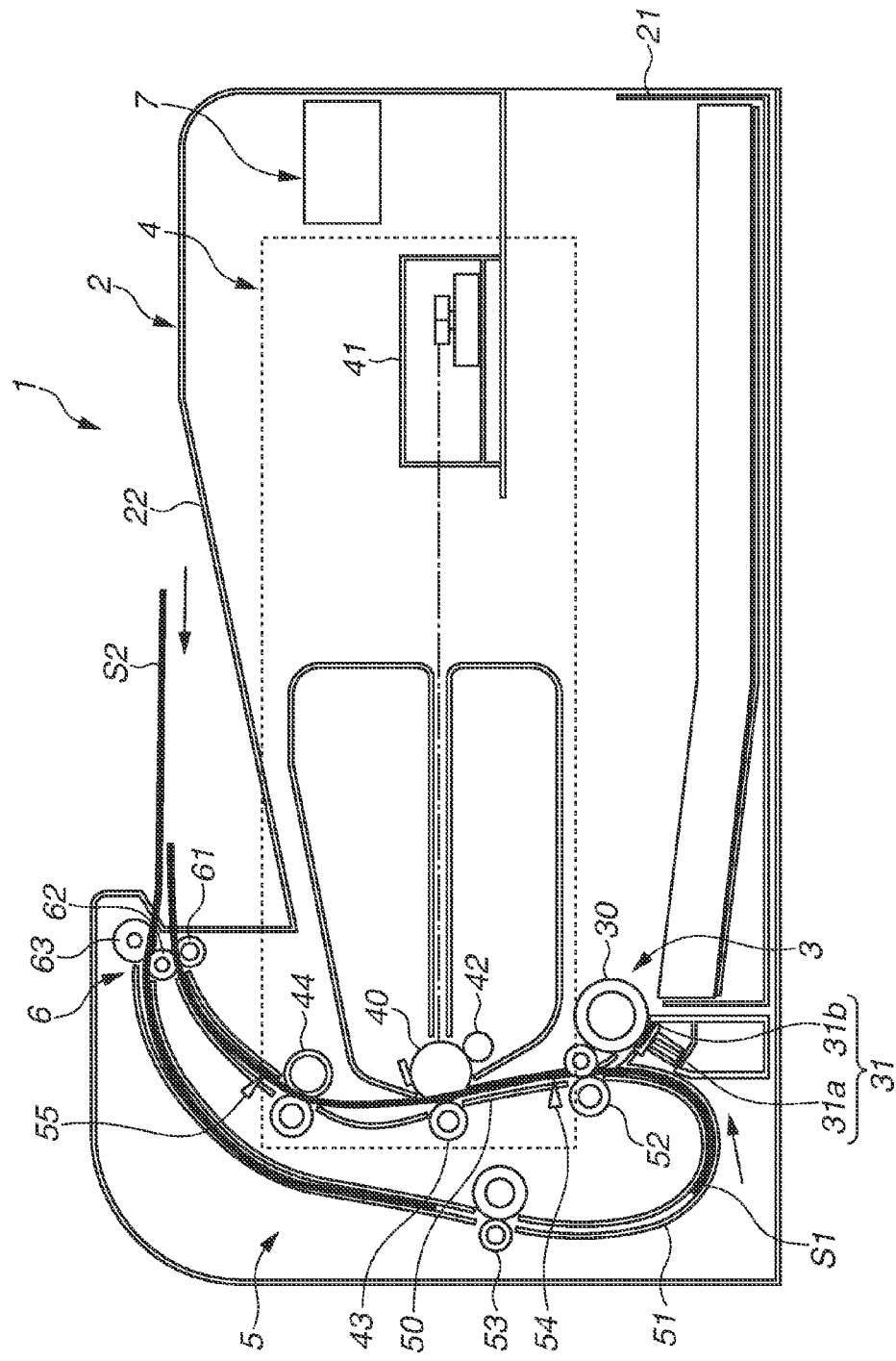
FIG. 16 is a schematic sectional view illustrating the sheet conveyance operation during continuous two-sided printing in the first embodiment.

FIG. 16 is a schematic sectional view illustrating a state in which the second sheet S2 is nipped by the second nip portion N2 according to the movement of the sheet discharge roller 61 in the reversing unit 6 and is then conveyed at the second nip portion N2 in the second direction. When the second sheet S2, which has been nipped at the first nip portion N1, moves to the second nip portion N2 according to the operation of movement of the sheet discharge roller 61, the second sheet S2 is conveyed at the second nip portion N2 in the second direction and is then conveyed to the second conveyance path 51. With regard to the second sheet S2, too, as with the first sheet S1, causing the second sheet S2, which has been nipped at the first nip portion N1, to be nipped at the second nip portion N2 according to the movement of the sheet discharge roller 61 allows making the first nip portion N1, at which the second sheet S2 has been conveyed, vacant. With this, in the process of the second sheet S2 being conveyed in the second direction, the first sheet S1 with an image formed on the second surface thereof at the image forming portion 4 can be conveyed to the first nip portion N1, so that the first sheet S1 is conveyed at the first nip portion N1 in the first direction. Accordingly, the second sheet S2 is conveyed at the second nip portion N2 in the second direction and the first sheet S1 with images formed on both sides thereof is conveyed at the first nip portion N1 in the first direction, so that the first sheet S1 and the second sheet S2 are cross-conveyed again in the reversing unit 6.

In the present embodiment, in this way, when the conveyance direction of the sheet S1 is changed, the second sheet S2 is conveyed to the reversing unit 6, so that the first sheet S1 and the second sheet S2 are cross-conveyed in the reversing unit 6. Moreover, in the process of the second sheet S2 being conveyed at the second nip portion N2 in the second direction, the first sheet S1 with image formation performed on the first surface and the second surface thereof arrives at the reversing unit 6, so that the first sheet S1 and the second sheet S2 can be cross-conveyed again.

Figure 17:
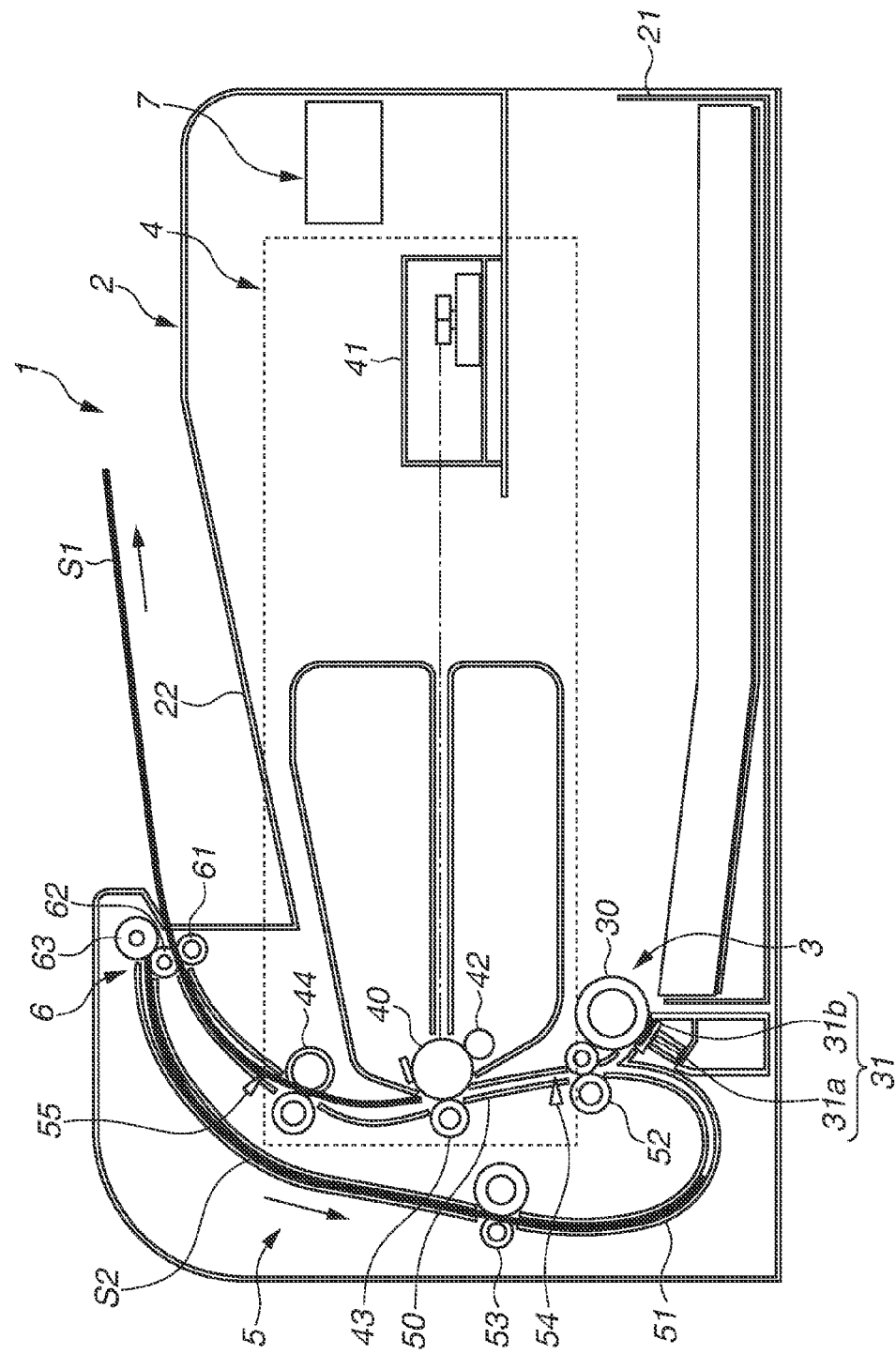
FIG. 17 is a schematic sectional view illustrating the sheet conveyance operation during continuous two-sided printing in the first embodiment.

FIG. 17 is a schematic sectional view illustrating a state obtained before the second sheet S2 is re-conveyed from the second conveyance path 51 to the first conveyance path 50. In this state, the first sheet S1 with images formed on both sides thereof is being conveyed at the first nip portion N1 in the first direction, and the trailing edge of the first sheet S1 has already passed the position at which the first conveyance path 50 and the second conveyance path 51 join together. Accordingly, the second sheet S2, which is re-conveyed to the first conveyance path 50, does not collide with the trailing edge of the first sheet S1, and the second sheet S2 is re-conveyed to the first conveyance path 50 at a predetermined interval from the first sheet S1.

Figure 18:
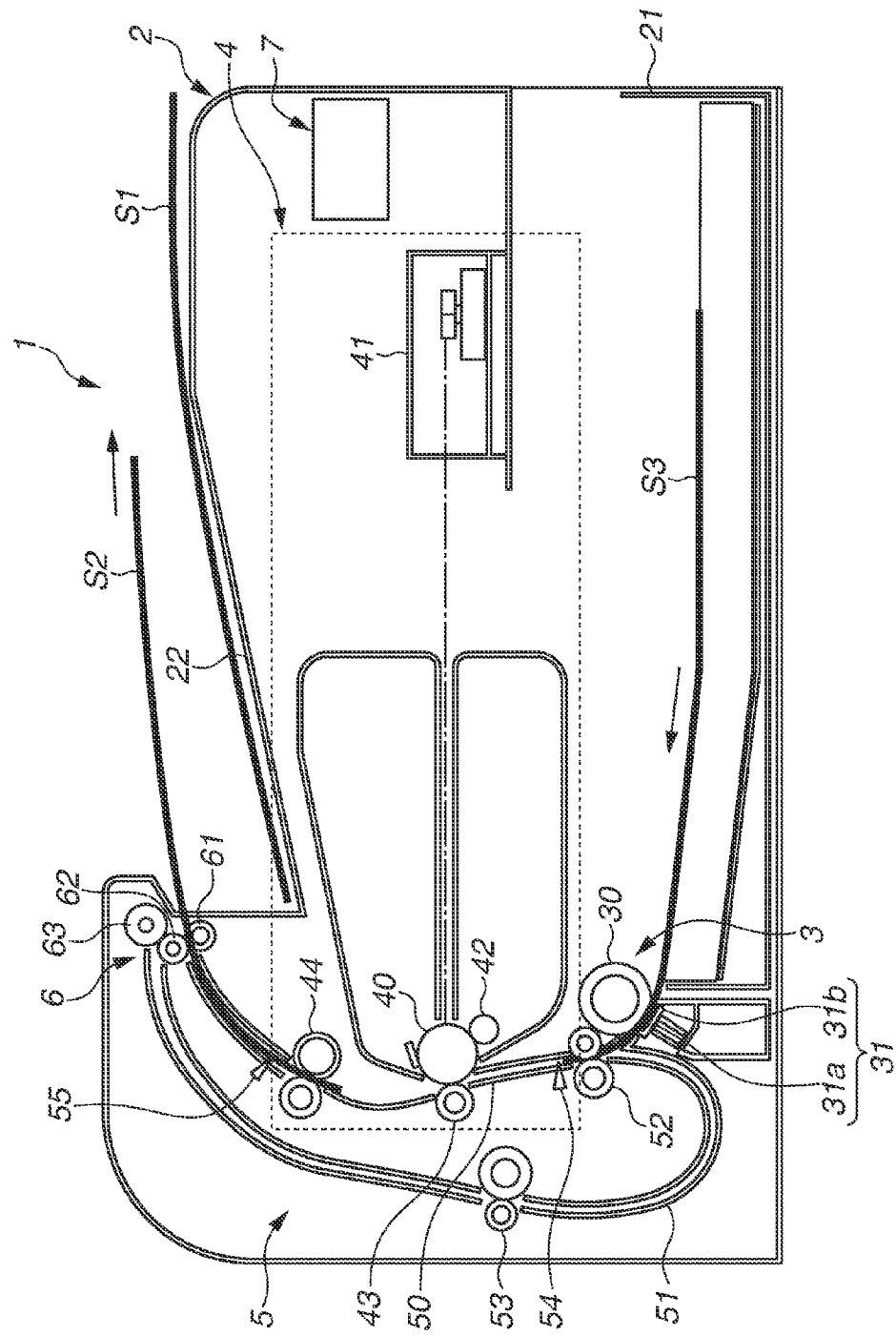
FIG. 18 is a schematic sectional view illustrating the sheet conveyance operation during continuous two-sided printing in the first embodiment.

FIG. 18 is a schematic sectional view illustrating a state obtained after the first sheet S1 with images formed on both sides thereof has been discharged from the first nip portion N1 to the sheet discharge tray 22. The first sheet S1 with images formed on both sides thereof is discharged to the sheet discharge tray 22 without movement of the sheet discharge roller 61 at the first nip portion N1, so that two-sided printing on the first sheet S1 is completed. Moreover, the second sheet S2 re-conveyed to the first conveyance path 50 and having images formed on both sides, the first surface and the second surface, thereof is conveyed at the first nip portion N1 in the first direction. At this time, the third sheet S3 is fed from the sheet feeding cassette 21 at a predetermined interval from the trailing edge of the second sheet S2, and is then fed to the image forming portion 4 by the feed roller 30.

Figure 19:
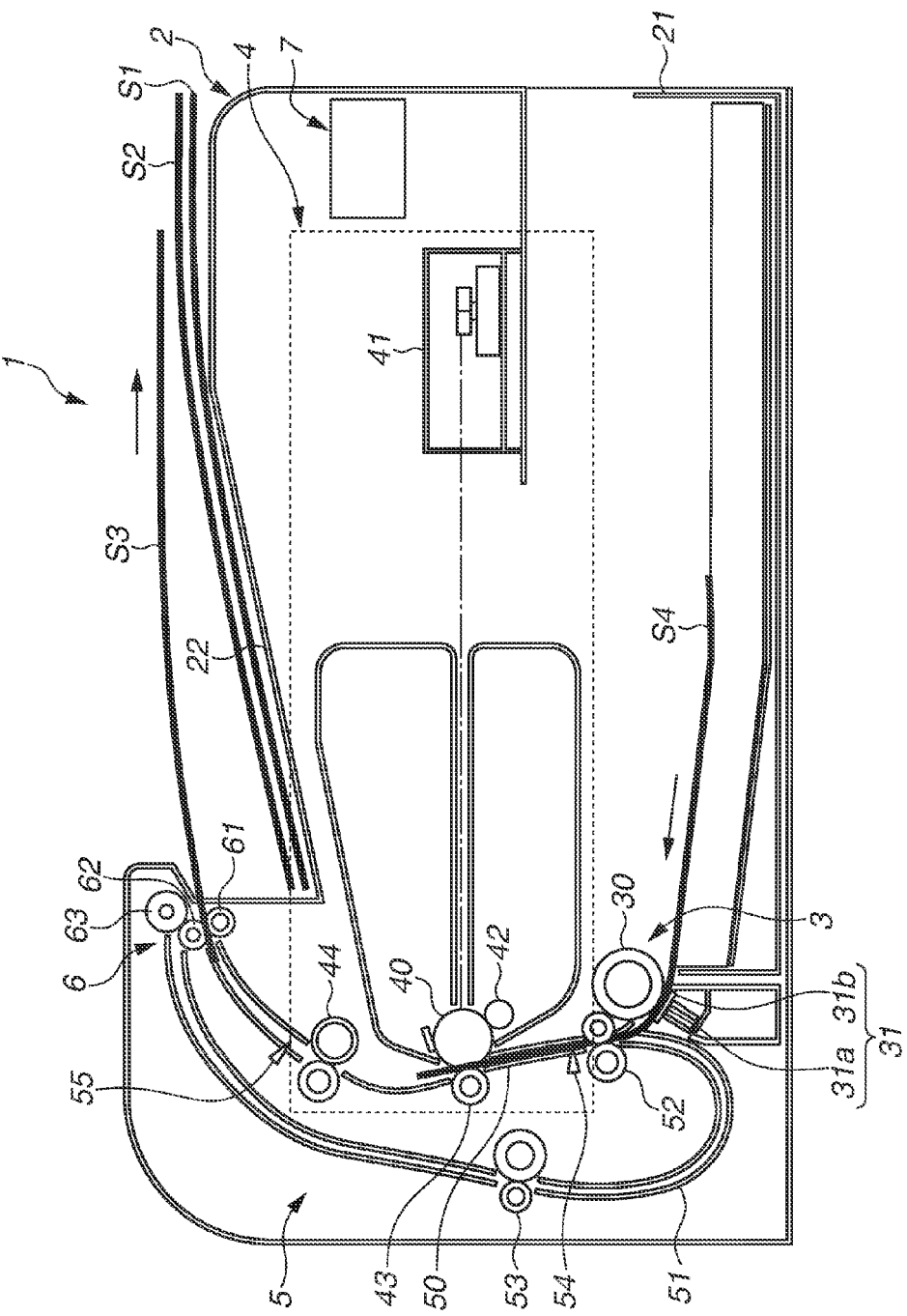
FIG. 19 is a schematic sectional view illustrating the sheet conveyance operation during continuous two-sided printing in the first embodiment.

FIG. 19 is a schematic sectional view illustrating a state obtained after the second sheet S2 with images formed on both sides thereof is discharged from the first nip portion N1 to the sheet discharge tray 22. As with the first sheet S1, the second sheet S2 with images formed on both sides thereof is also discharged to the sheet discharge tray 22 without movement of the sheet discharge roller 61 at the first nip portion N1. With this, two-sided printing on the second sheet S2 is also completed, so that the first sheet S1 and the second sheet S2 are stacked on the sheet discharge tray 22. Moreover, the third sheet S3 with an image formed on the first surface thereof is conveyed in the first direction at the first nip portion N1 in the reversing unit 6. At this time, the fourth sheet S4 is fed from the sheet feeding cassette 21 at an interval from the trailing edge of the third sheet S3 and is then fed to the image forming portion 4 by the feed roller 30.

Following that, in a similar way to the case of the first sheet S1 and the second sheet S2, a series of operations illustrated in FIG. 12 to FIG. 19 is performed with respect to the third sheet S3 and the fourth sheet S4, so that the third sheet S3 and the fourth sheet S4 on both of which two-sided printing is completed are discharged to and stacked on the sheet discharge tray 22.

In the present embodiment, performing the operation of moving the sheet discharge roller 61 in the reversing unit 6 allows efficiently cross-conveying a plurality of sheets S.

As described above, in the present embodiment, according to the sheet discharge roller 61 being moved, the sheet S, which has been conveyed at the first nip portion N1 in the first direction, can be moved to the second nip portion N2 and then conveyed in the second direction. In other words, the sheet S, which has been conveyed to the reversing unit 6, is switched from the state of being nipped by the first nip portion N1 to the state of being nipped by the second nip portion N2 by the operation of movement of the sheet discharge roller 61, so that the first nip portion N1 can be made vacant. Accordingly, in a case where two-sided printing is performed on a plurality of sheets S, during a period in which the first sheet is conveyed at the second nip portion N2 in the second direction, the second sheet can be conveyed at the first nip portion N1 in the first direction. Moreover, with respect to the second sheet S2, too, as with the first sheet S1, according to the sheet discharge roller 61 being moved, the second sheet S2, which has been conveyed at the first nip portion N1 in the first direction, is nipped at the second nip portion N2, so that the first nip portion N1 can be made vacant. With this, during a period in which the second sheet S2 is conveyed in the second direction, the first sheet S1 with image formation performed on both sides thereof is conveyed to the first nip portion N1, so that cross-conveyance can be re-performed in the reversing unit 6 and, thus, the conveyance efficiency for the sheet S can be improved.

Furthermore, in the configuration of the present embodiment, since, when the first sheet S1 is conveyed in the second direction, the second sheet S2 can be conveyed to the reversing unit 6, the conveyance interval between the first sheet S1 and the second sheet S2 can be shortened. With this, since discharging of the second sheet S2 with two-sided printing thereon completed is performed earlier as much as the conveyance interval between the first sheet S1 and the second sheet S2 is shortened, two-sided printing can be efficiently performed.

Furthermore, in the present embodiment, the reversing unit 6 has been described in which the roller 61b of the sheet discharge roller 61, the rubber portion 62b of the driving roller 62, and the rubber portion 63b of the reversing roller 63 are located opposite each other. However, the reversing unit 6 is not limited to this configuration, but can be a comb-teeth roller configuration in which the roller 61b of the sheet discharge roller 61, the rubber portion 62b of the driving roller 62, and the rubber portion 63b of the reversing roller 63 are located alternately in a comb-teeth shape.

Figure 20:
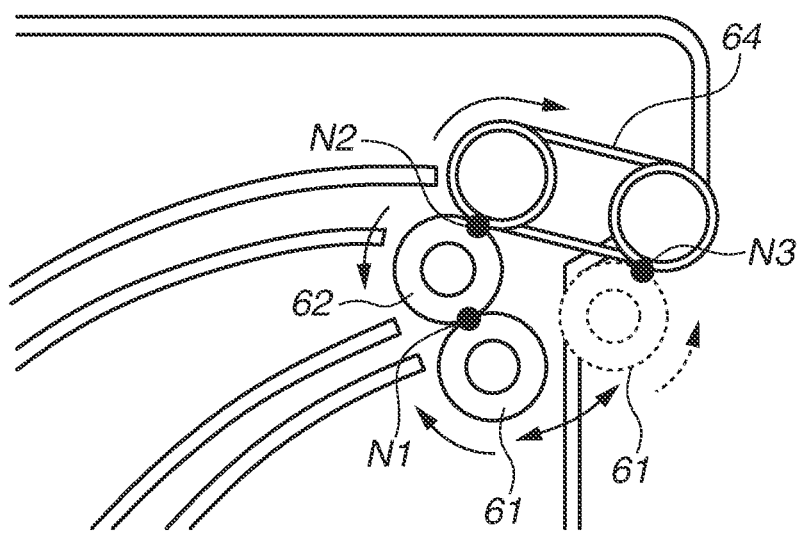
FIG. 20 is a schematic view illustrating another configuration of a reversing roller in the reversing unit in the first embodiment.

Moreover, while, in the present embodiment, the reversing roller 63 including the shaft 63a and the rubber portion 63b is used, as illustrated in FIG. 20, the reversing roller 63 can be configured as a rotating member such as a conveyance belt 64. In the configuration illustrated in FIG. 20, optionally setting the length of the conveyance belt 64 allows improving the degree of freedom of setting the position to nip the sheet S when the sheet discharge roller 61 is moved to abut on the conveyance belt 64, so that the sheet S can be more stably conveyed. Furthermore, in the configuration illustrated in FIG. 20, since the sheet discharge roller 61 moves between the initial position indicated by a solid line and the reversing position indicated by a dashed line, an effect similar to that of the present embodiment can be attained.

Furthermore, while, in the present embodiment, a configuration in which the driving roller 62 receives driving force from a drive force to rotate has been described, not only this, but a configuration in which the reversing roller 63 receives driving force from a drive force to rotate can be employed. In that case, the driving roller 62 can be driven by the rotation of the reversing roller 63 to rotate, or both the driving roller 62 and the reversing roller 63 can be configured to receive driving force from a drive force to rotate.

In the first embodiment, a configuration for switching a nip portion which nips the sheet S from the first nip portion N1 to the second nip portion N2 by moving the sheet discharge roller 61 has been described. On the other hand, in a second embodiment, a configuration for switching a nip portion which nips the sheet S from a first nip portion N21 to a second nip portion N22 by moving a reversing roller 263 is described. Furthermore, the configuration in the present embodiment is similar to that in the first embodiment except for the operation of moving the reversing roller 263 and the configuration of a reversing unit 206 for moving the reversing roller 263. Accordingly, in the present embodiment, portions similar to those in the first embodiment are omitted from description, and portions different from those in the first embodiment are mainly described with reference to FIG. 21 to FIGS. 23A, 23B, and 23C.

Figure 21:
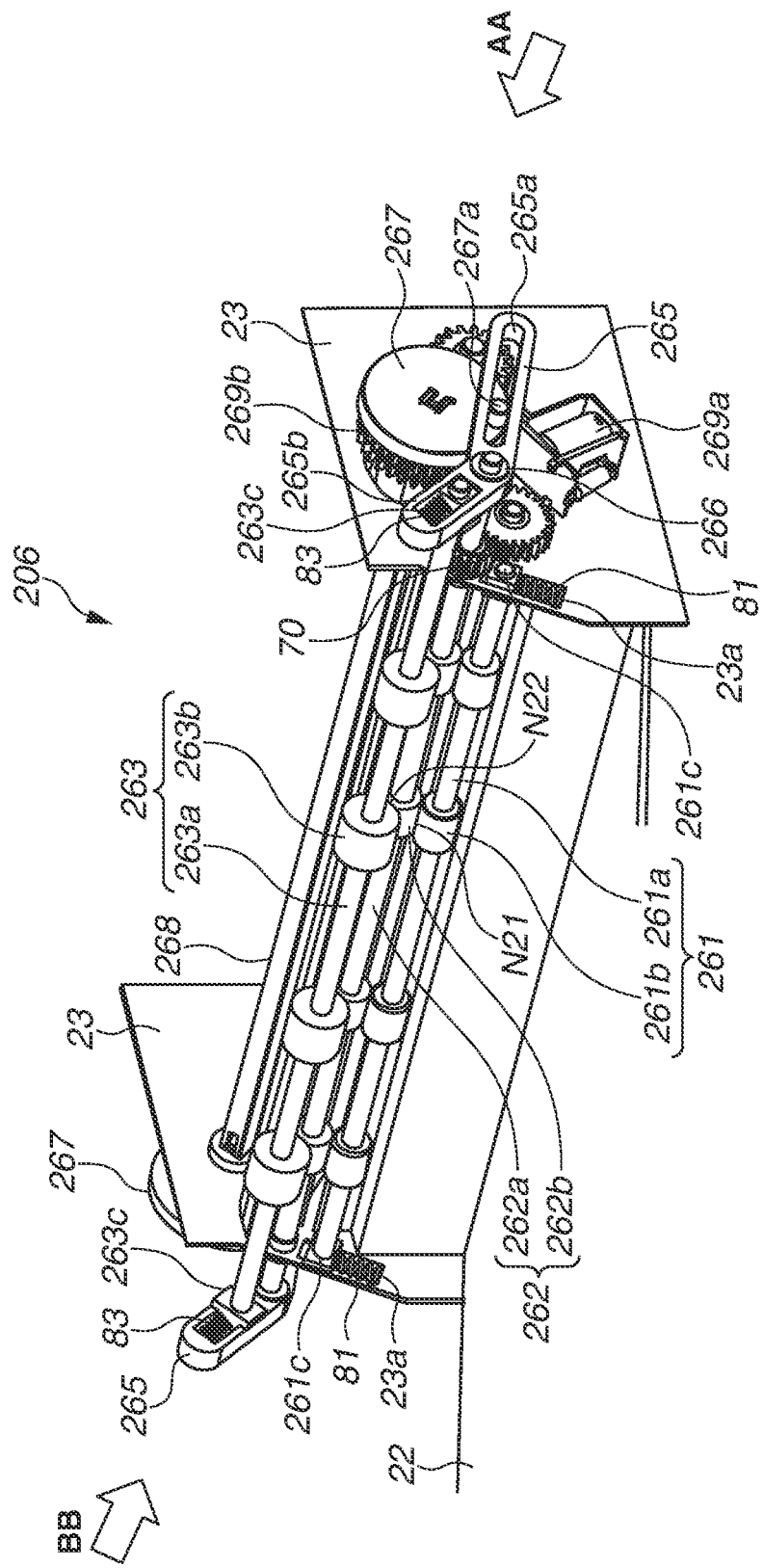
FIG. 21 is a schematic view illustrating a configuration of a reversing unit in a second embodiment.

FIG. 21 is a schematic view illustrating a configuration of the reversing unit 206 in the present embodiment as viewed from the downstream side regarding the sheet conveyance direction. As illustrated in FIG. 21, a driving roller 262 (a first rotating member) is configured with a shaft 262a and a rubber portion 262b, and the reversing roller 263 (a third rotating member) is configured with a shaft 263a and a rubber portion 263b. Moreover, a sheet discharge roller 261 (a second rotating member) is configured with a shaft 261a and a roller 261b made from synthetic resin. Furthermore, while, in the present embodiment, the roller 261b is formed on the shaft 261a to configure the sheet discharge roller 261, the shaft 261a and the roller 261b can be integrally molded.

The sheet discharge roller 261 is rotatably held by a sheet discharge roller bearing 261c, which is held to be movable along a guide hole 23a provided in the frame 23 of the main body 2. Moreover, the sheet discharge roller 261 is urged by a spring 81 (a first urging member) toward the driving roller 262 via the sheet discharge roller bearing 261c. Since the driving roller 262 is pressed by the sheet discharge roller 261, the driving roller 262 and the sheet discharge roller 261 abut on each other, so that a first nip portion N21 is formed.

The driving roller 262 is held on the frame 23 in a rotatable manner. A reversing roller holder 265 is rotatable around a fulcrum point 266, and each end of the reversing roller 263 is rotatably held by a reversing roller bearing 263c provided in a fitting groove 265b of the reversing roller holder 265. Moreover, the reversing roller 263 is urged toward the driving roller 262 by a spring 83 (a second urging member) via the reversing roller bearing 263c. Since the driving roller 262 is pressed by the reversing roller 263, the driving roller 262 and the reversing roller 263 abut on each other, so that a second nip portion N22 is formed.

The reversing roller holder 265 is provided with the fitting groove 265b, which holds the reversing roller 263, at one end thereof and a guide groove 265a at the other end thereof across the fulcrum point 266. Moreover, the fulcrum point 266 is provided on the same axis as that of the shaft 262a serving as a rotation axis of the driving roller 262. Accordingly, when the reversing roller holder 265 rotates around the fulcrum point 266, the reversing roller 263 moves along the outer circumference of the driving roller 262 while being urged toward the driving roller 262 without moving away from the driving roller 262.

Each end of a cam shaft 268, which is located opposite and approximately in parallel with the driving roller 262, is provided with a cam 267, which is rotatable around the cam shaft 268. The cam 267 has a cylindrical projection portion 267a on a surface thereof different from the surface thereof used to hold the cam shaft 268, and the projection portion 267a is fitted in the guide groove 265a, so that the cam 267 is held by the reversing roller holder 265. Moreover, one end side of the cam shaft 268 is provided with a cam driving portion 269, configured with a solenoid 269a (a switchover member) and a partially toothed gear 269b, which is capable of switching ON and OFF of driving for rotating the cam 267. Furthermore, as with the first embodiment, the partially toothed gear 269b is provided with two toothless portions (not illustrated), and the solenoid 269a is provided with a hook portion (not illustrated) which is engageable with the toothless portion of the partially toothed gear 269b. With this, the partially toothed gear 269b is configured to rotate in increments of a predetermined angle and stop at two portions during one rotation according to the solenoid 269a being turned on and off.

Figure 22A:
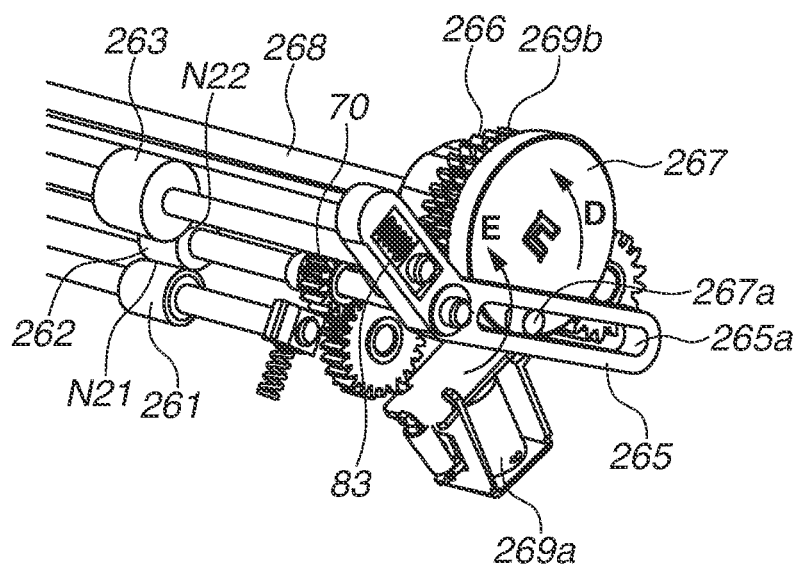
FIGS. 22A and 22B are schematic views illustrating a motion mechanism of the reversing unit in the second embodiment.

Here, the operation of movement of the reversing roller 263 in the reversing unit 206 is described with reference to FIGS. 22A and 22B. FIG. 22A is a schematic view illustrating a configuration of the reversing unit 206 in a state obtained before the operation of moving the reversing roller 263 is performed in the present embodiment, and FIG. 22B is a schematic view illustrating a configuration of the reversing unit 206 in a state obtained after the movement of the reversing roller 263 is performed.

In the state illustrated in FIG. 22A, the sheet discharge roller 261 abuts on the driving roller 262 to form the first nip portion N21 in conjunction with the driving roller 262, and the reversing roller 263 abuts on the driving roller 262 to form the second nip portion N22 in conjunction with the driving roller 262. The reversing roller 263 has not yet started the operation of movement, and the position of the reversing roller 263 illustrated in FIG. 22A is referred to as an "initial position" (a first position).

At this time, the hook portion of the solenoid 269a is engaged with the first toothless portion of the partially toothed gear 269b, and the partially toothed gear 269b is locked with transmission of driving stopped, so that the cam 267 remains still without rotation. In this state, when the solenoid 269a is energized to unlock the partially toothed gear 269b, as illustrated in FIG. 22A, the cam 267 rotates in the direction of arrow D in FIG. 22A. Furthermore, according to rotation of the cam 267, the projection portion 267a fitted in the guide groove 265a of the reversing roller holder 265 also starts rotating in the direction of arrow D in FIG. 22A. With this, the reversing roller holder 265 rotates in the direction of arrow E in FIG. 22A around the fulcrum point 266, so that the reversing roller 263, which is held at each side thereof by the reversing roller bearing 263c provided in the reversing roller holder 265, starts moving.

Figure 22B:
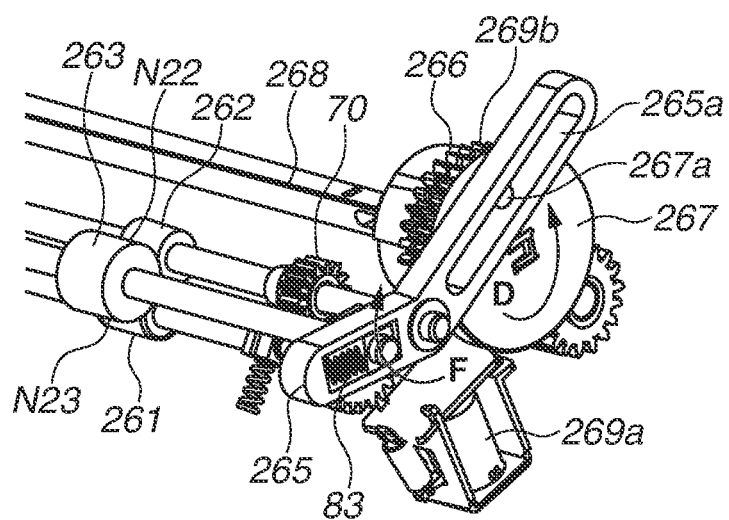

FIG. 22B illustrates the position of the reversing roller 263 at the time when, according to rotation of the cam 267, the reversing roller 263 moves and then abuts on the sheet discharge roller 261, and the position of the reversing roller 263 at this time is referred to as a "reversing position" (a second position). When the partially toothed gear 269b rotates from the state illustrated in FIG. 22A and then enters the state illustrated in FIG. 22B, the second toothless portion of the partially toothed gear 269b arrives at such a position as to be engaged with the hook portion of the solenoid 269a. At this time, energization of the solenoid 269a is already stopped, the second toothless portion of the partially toothed gear 269b and the hook portion of the solenoid 269a are engaged with each other, the partially toothed gear 269b is locked with transmission of driving stopped, and the cam 267 stops rotating. With this, the rotation of the reversing roller holder 265 and the movement of the reversing roller 263 are stopped, so that the reversing roller 263 stops in the reversing position.

As illustrated in FIG. 22B, the reversing roller 263, which is held by the reversing roller holder 265, is urged by the spring 83 toward the driving roller 262 even when in the reversing position, and the second nip portion N22 is formed by the driving roller 262 and the reversing roller 263. Moreover, the reversing roller 263 moves along the outer circumference of the driving roller 262 and then abuts on the sheet discharge roller 261, so that a third nip portion N23 is formed by the reversing roller 263 and the sheet discharge roller 261. At this time, the reversing roller 263 interposes between the driving roller 262 and the sheet discharge roller 261, which form the first nip portion N21, and presses the sheet discharge roller 261 against the urging force of the spring 81, which urges the sheet discharge roller 261 toward the driving roller 262. With this, the sheet discharge roller 261 moves in a direction away from the driving roller 262, so that the first nip portion N21 is dissolved.

In this state, when the solenoid 269a is re-energized to unlock the partially toothed gear 269b, the cam 267 rotates further in the direction of arrow D in FIG. 22B, and the reversing roller holder 265 rotates around the fulcrum point 266 in the direction of arrow F in FIG. 22B. When, according to the partially toothed gear 269b rotating, the projection portion 267a moves from the position illustrated in FIG. 22B to the position illustrated in FIG. 22A, the first toothless portion of the partially toothed gear 269b arrives at such a position as to be engaged with the hook portion of the solenoid 269a. At this time, energization of the solenoid 269a is already stopped, the first toothless portion of the partially toothed gear 269b and the hook portion of the solenoid 269a are engaged with each other, the partially toothed gear 269b is locked with transmission of driving stopped, and the cam 267 stops rotating.

With this, the reversing roller 263 moves from the reversing position to the initial position, and then stops in the initial position. Furthermore, according to the reversing roller 263 moving from the revering position, the sheet discharge roller 261 and the driving roller 262 re-abut on each other, thus forming the first nip portion N21. As described above, a series of operations of the reversing roller 263 moving in the reversing unit 206 is performed during a period in which the cam 267 is rotated one revolution by the cam driving portion 269.

Figure 23A:
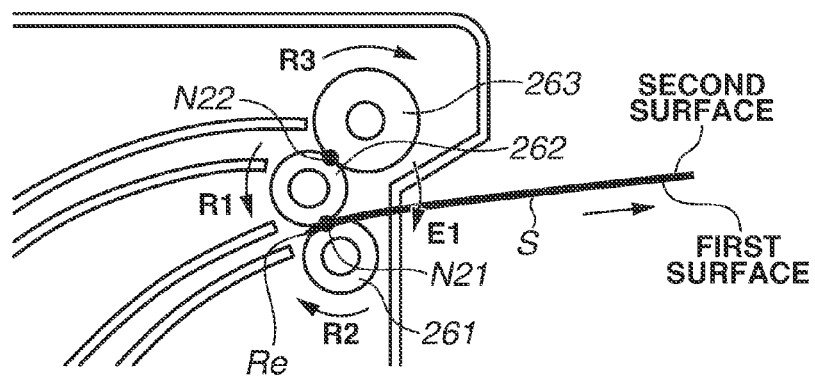
FIGS. 23A, 23B, and 23C are schematic views illustrating an operation of the reversing unit in the second embodiment.
Figure 23B:
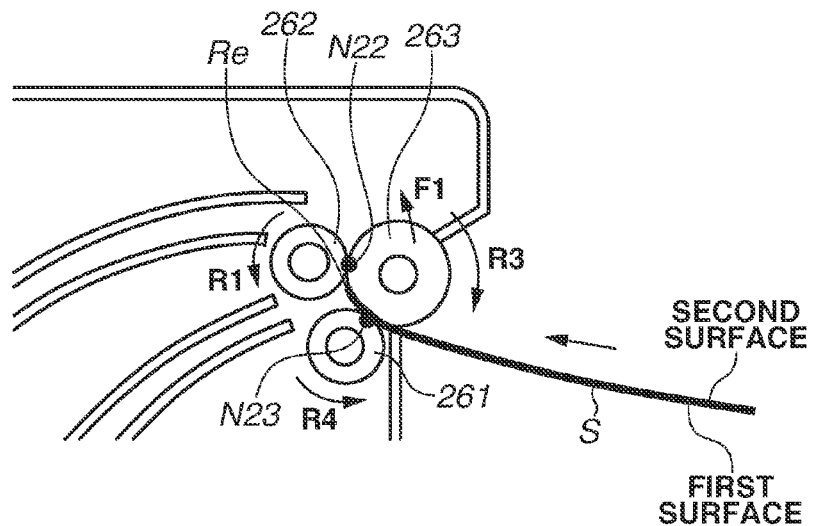
Figure 23C:
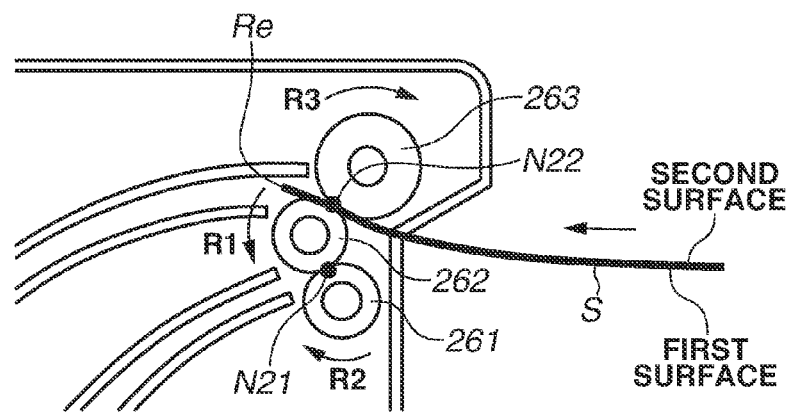

Next, the operation of conveying the sheet S by the reversing unit 206 is described with reference to FIGS. 23A, 23B, and 23C. FIG. 23A is a schematic sectional view of the reversing unit 206 as viewed from the axial direction of the reversing roller 263 in a state obtained before the operation of moving the reversing roller 263 is performed. FIG. 23B is a schematic sectional view of the reversing unit 206 as viewed from the axial direction of the reversing roller 263 in a state obtained when the reversing roller 263 has moved from the initial position to the reversing position. FIG. 23C is a schematic sectional view of the reversing unit 206 as viewed from the axial direction of the reversing roller 263 in a state obtained when the reversing roller 263 has moved from the reversing position to the initial position and a series of operations of moving the reversing roller 263 has been completed.

In the state illustrated in FIG. 23A, the sheet discharge roller 261 and the driving roller 262 abut on each other to form the first nip portion N21, and the sheet discharge roller 261 is rotating in the direction of arrow R2 in FIG. 23A by receiving rotative force from the driving roller 262, which rotates in the direction of arrow R1 in FIG. 23A. With this, the sheet S is conveyed at the first nip portion N21 in the first direction, which is a direction to discharge the sheet S from the main body 2, with the first surface in contact with the sheet discharge roller 261 and the second surface in contact with the driving roller 262 (in a first state). Moreover, the second nip portion N22 is formed at the position where the reversing roller 263 and the driving roller 262 abut on each other, and the reversing roller 263 is rotating in the direction of arrow R3 in FIG. 23A by receiving rotative force from the driving roller 262, which rotates in the direction of arrow R1 in FIG. 23A. With this, at the second nip portion N22, the sheet S can be conveyed in the second direction, which is a direction opposite to the conveyance direction of the sheet S at the first nip portion N21.

In the present embodiment, too, as with the first embodiment, the reversing roller 263 starts the operation of movement before the trailing edge Re of the sheet S conveyed in the first direction is conveyed at the first nip portion N21, and moves from the initial position toward the reversing position in the direction of arrow E1 in FIG. 23A. At this time, the reversing roller 263 moves to the downstream side of the driving roller 262 with respect to the first direction, in which the sheet S is conveyed. As illustrated in FIG. 23B, when the reversing roller 263 moves to the reversing position, the third nip portion N23 is formed by the reversing roller 263 and the sheet discharge roller 261, and the first nip portion N21, which is formed by the sheet discharge roller 261 and the driving roller 262, is dissolved. With this, the sheet S enters a state of being nipped by the third nip portion N23.

In the state illustrated in FIG. 23B, the reversing roller 263 is rotating in the direction of arrow R3 in FIG. 23B by receiving rotative force from the driving roller 262, which rotates in the direction of arrow R1 in FIG. 23B, and the sheet discharge roller 261 rotates in the direction of arrow R4 in FIG. 23B by receiving rotative force from the reversing roller 263. With this, the sheet S is conveyed at the third nip portion N23 in the second direction, which is a direction opposite to the conveyance direction at the first nip portion N21, and, after being conveyed from the third nip portion N23 toward the second nip portion N22, is nipped at the second nip portion N22.

When the reversing roller 263 moves in the direction of arrow F1 in FIG. 23B from the reversing position toward the initial position, as illustrated in FIG. 23C, the first nip portion N21 is re-formed by the sheet discharge roller 261 and the driving roller 262. At this time, the sheet S is nipped at the second nip portion N22 and is conveyed in the second direction with the first surface in contact with the driving roller 262 and the second surface in contact with the reversing roller 263 (in a second state).

In the above-described way, in the present embodiment, the nipped state of the sheet S is switched from the first state to the second state by moving the reversing roller 263 by a switching unit which includes the cam 267, the cam shaft 268, and the cam driving portion 269. As described above, even in the present embodiment, an effect similar to that in the first embodiment can be attained.

Furthermore, while, in the present embodiment, a configuration in which the driving roller 262 receives driving force from a drive force to rotate has been described, not only this, but a configuration in which the reversing roller 263 receives driving force from a drive force to rotate can be employed. In that case, the driving roller 262 can be driven by the rotation of the reversing roller 263 to rotate, or both the driving roller 262 and the reversing roller 263 can be configured to receive driving force from a drive force to rotate.

Moreover, while, in the present embodiment, an example in which is applied to an electrophotographic type image forming apparatus has been described, embodiments are not limited to this, but can also be applied to an image forming apparatus of the type other than the electrophotographic type, such as an inkjet type image forming apparatus.

While embodiments in which an image forming apparatus is used as a sheet conveyance device have been described above, the sheet conveyance device according is not limited to this. Embodiments can be applied to an apparatus which changes the conveyance direction of the sheet S from a first conveyance direction to a second conveyance direction, and an effect similar to those of the embodiments. In other words, embodiments can also be applied to an image reading apparatus which reads an image on the conveyed sheet S, as illustrated in FIG. 24, and a similar effect can also be attained.

The image reading apparatus 301, which serves as a sheet conveyance device in the present embodiment, includes an image reading portion 304, which reads an image on the conveyed sheet S. Furthermore, since the configuration of a reversing unit 306 in the present embodiment is similar to that in the first embodiment, portions different from those in the first embodiment, such as a configuration of the image reading apparatus 301 and a method for reading images on both sides of the sheet S, are mainly described, and portions similar to those in the first embodiment are omitted from description.

Sheets S contained in a sheet feeding cassette 321 serving as a container portion are fed by the rotation of a feed roller 330 and, after being separated one by one at a separation unit 352, are conveyed to the image reading portion 304 through a first conveyance path 350 by conveyance roller pairs 356 and 357. After an image on the first surface of the sheet S is read at the image reading portion 304, the sheet S is conveyed to the reversing unit 306 and is then nipped at a first nip portion N31, which is formed by a driving roller 362 (a first rotating member) and a sheet discharge roller 361 (a second rotating member). According to rotation of the driving roller 362, the sheet S nipped by the driving roller 362 and the sheet discharge roller 361 is conveyed from the driving roller 362 toward a sheet discharge tray 322 serving as a stacking portion, thus being conveyed in a direction in which the sheet S is discharged from the apparatus body 302 (a first direction). Then, the sheet discharge roller 361 starts moving before the trailing edge of the sheet S is conveyed to the sheet discharge tray 322 by the driving roller 362 and the sheet discharge roller 361.

According to movement of the sheet discharge roller 361, the sheet S, which has been nipped at the first nip portion N31, is nipped at a second nip portion N32, which is formed by the driving roller 362 and a reversing roller 363 (a third rotating member), and is then conveyed in a direction from the sheet discharge tray 322 toward a second conveyance path 351 (a second direction). After that, the sheet S is re-conveyed to the image reading portion 304 through the first conveyance path 350 by the conveyance roller pairs 356 and 357, and an image on the second surface of the sheet S is read at the image reading portion 304. The sheet S, images on both sides, the first surface and the second surface, of which have been read, is re-conveyed to the first nip portion N31 and, after being nipped by the driving roller 362 and the sheet discharge roller 361, is then discharged to the sheet discharge tray 322 according to rotation of the driving roller 362.

In the above-described way, in the present embodiment, moving the sheet discharge roller 361 in the reversing unit 306 also allows the sheet S, which has been nipped at the first nip portion N31, to be nipped at the second nip portion N32 without being completely discharged from the reversing unit 306. Accordingly, embodiments can also be applied to an image reading apparatus which reads an image on the conveyed sheet S, and an effect similar to that in the first embodiment can be attained.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-192722 filed Sep. 30, 2016, which is hereby incorporated by reference herein in its entirety.

What is claimed is:

1. A sheet conveyance device comprising:
a first rotating member configured to rotate in one direction;
a second rotating member configured to convey a sheet in a first direction in conjunction with the first rotating member according to the first rotating member rotating;
a third rotating member configured to convey the sheet in a second direction different from the first direction in conjunction with the first rotating member according to the first rotating member rotating; and
a switching unit configured to switch from a first state in which the second rotating member contacts a first surface of the sheet and the first rotating member contacts a second surface opposite to the first surface of the sheet to a second state in which the first rotating member contacts the first surface of the sheet and the third rotating member contacts the second surface of the sheet by moving the second rotating member before a trailing edge of the sheet conveyed in the first direction is conveyed by the first rotating member and the second rotating member.

2. The sheet conveyance device according to claim 1, wherein the second rotating member contacts the first rotating member to form a first nip portion, and the third rotating member contacts the first rotating member at a position different from that of the second rotating member regarding a circumferential direction of the first rotating member to form a second nip portion.

3. The sheet conveyance device according to claim 1, wherein, in a state in which the first surface of the sheet is in contact with the second rotating member, the switching unit moves the second rotating member to a position at which the second rotating member contacts the first surface of the sheet and the third rotating member contacts the second surface of the sheet.

4. The sheet conveyance device according to claim 3, wherein the second rotating member contacts the first rotating member to form a first nip portion, and the third rotating member contacts the first rotating member at a position different from that of the second rotating member regarding a circumferential direction of the first rotating member to form a second nip portion, and
wherein, in a state in which the switching unit has moved the second rotating member to a position at which the second rotating member contacts the first surface of the sheet and the third rotating member contacts the second surface of the sheet, the second rotating member and the third rotating member abut on each other via the sheet to form a third nip portion.

5. The sheet conveyance device according to claim 4, wherein, in a state in which the switching unit has moved the second rotating member, the sheet is conveyed in the second direction in a state in which the second rotating member and the first rotating member contact the first surface of the sheet and the third rotating member contacts the second surface of the sheet.

6. The sheet conveyance device according to claim 5, wherein, in a state in which the sheet is being conveyed in the second direction, the switching unit moves the second rotating member to a position at which the second rotating member does not contact the first surface of the sheet and the second rotating member is able to convey a sheet in the first direction in conjunction with the first rotating member.

7. The sheet conveyance device according to claim 1, wherein, in a case where a first sheet and a second sheet following the first sheet are continuously conveyed, the switching unit causes the first rotating member and the second rotating member to convey the second sheet in the first direction while causing the first sheet to be conveyed in the second direction by switching from a first state in which the second rotating member contacts a first surface of the first sheet and the first rotating member contacts a second surface opposite to the first surface of the first sheet to a second state in which the first rotating member contacts the first surface of the first sheet and the third rotating member contacts the second surface of the first sheet by moving the second rotating member before a trailing edge of the first sheet conveyed in the first direction is conveyed by the first rotating member and the second rotating member.

8. The sheet conveyance device according to claim 1, further comprising a drive motor configured to rotate only in one direction,
wherein the first rotating member receives a drive force from the drive motor to rotate only in one direction.

9. The sheet conveyance device according to claim 1, further comprising:
a stacking portion configured to stack a discharged sheet;
a first conveyance path through which to convey a sheet toward the first rotating member and the second rotating member; and
a second conveyance path through which to re-convey a sheet conveyed by the first rotating member and the second rotating member in the first direction to the first conveyance path,
wherein the first direction is a direction in which a sheet is conveyed by the first rotating member and the second rotating member from the first rotating member toward the stacking portion, and the second direction is a direction in which a sheet is conveyed by the first rotating member and the third rotating member from the stacking portion toward the second conveyance path.

10. A sheet conveyance device comprising:
a first rotating member configured to rotate in one direction;
a second rotating member configured to convey a sheet in a first direction in conjunction with the first rotating member according to the first rotating member rotating;
a third rotating member configured to convey the sheet in a second direction different from the first direction in conjunction with the first rotating member according to the first rotating member rotating; and
a switching unit configured to switch from a first state in which the second rotating member contacts a first surface of the sheet and the first rotating member contacts a second surface opposite to the first surface of the sheet to a second state in which the first rotating member contacts the first surface of the sheet and the third rotating member contacts the second surface of the sheet by moving the third rotating member before a trailing edge of the sheet conveyed in the first direction is conveyed by the first rotating member and the second rotating member.

11. The sheet conveyance device according to claim 10, wherein the switching unit includes an urging member configured to urge the third rotating member toward the first rotating member, and the third rotating member moves along an outer circumference of the first rotating member in a state of being urged by the urging member toward the first rotating member.

12. The sheet conveyance device according to claim 10, wherein the second rotating member contacts the first rotating member to form a first nip portion, and the third rotating member contacts the first rotating member at a position different from that of the second rotating member regarding a circumferential direction of the first rotating member to form a second nip portion.

13. The sheet conveyance device according to claim 10, wherein, in a state in which the first surface of the sheet is in contact with the second rotating member, the switching unit moves the third rotating member to a position at which the second rotating member contacts the first surface of the sheet and the third rotating member contacts the second surface of the sheet.

14. The sheet conveyance device according to claim 13,
wherein the second rotating member contacts the first rotating member to form a first nip portion, and the third rotating member contacts the first rotating member at a position different from that of the second rotating member regarding a circumferential direction of the first rotating member to form a second nip portion, and
wherein, in a state in which the switching unit has moved the third rotating member to a position at which the second rotating member contacts the first surface of the sheet and the third rotating member contacts the second surface of the sheet, the second rotating member and the third rotating member abut on each other via the sheet to form a third nip portion.

15. The sheet conveyance device according to claim 14, wherein, in a state in which the switching unit has moved the third rotating member, the sheet is conveyed in the second direction in a state in which the second rotating member and the first rotating member contact the first surface of the sheet and the third rotating member contacts the second surface of the sheet.

16. The sheet conveyance device according to claim 15, wherein the switching unit causes the sheet to be conveyed in the second direction in a state in which the first rotating member contacts the first surface of the sheet and the third rotating member contacts the second surface of the sheet while moving the third rotating member to a position at which the third nip portion is dissolved during a period in which the sheet is conveyed in the second direction.

17. The sheet conveyance device according to claim 10, wherein, in a case where a first sheet and a second sheet following the first sheet are continuously conveyed, the switching unit causes the first rotating member and the second rotating member to convey the second sheet in the first direction while causing the first sheet to be conveyed in the second direction by switching from a first state in which the second rotating member contacts a first surface of the first sheet and the first rotating member contacts a second surface opposite to the first surface of the first sheet to a second state in which the first rotating member contacts the first surface of the first sheet and the third rotating member contacts the second surface of the first sheet by moving the third rotating member before a trailing edge of the first sheet conveyed in the first direction is conveyed by the first rotating member and the second rotating member.

18. The sheet conveyance device according to claim 10, further comprising a drive motor configured to rotate only in one direction,
wherein the first rotating member receives a drive force from the drive motor to rotate only in one direction.

19. The sheet conveyance device according to claim 10, further comprising:
a stacking portion configured to stack a discharged sheet;
a conveyance path through which to convey a sheet toward the first rotating member and the second rotating member; and
a re-conveyance path through which to re-convey a sheet conveyed by the first rotating member and the second rotating member in the first direction to the conveyance path,
wherein the first direction is a direction in which a sheet is conveyed by the first rotating member and the second rotating member from the first rotating member toward the stacking portion, and the second direction is a direction in which a sheet is conveyed by the first rotating member and the third rotating member from the stacking portion toward the re-conveyance path.

* * * * *